United States Patent
De Asmundis

(10) Patent No.: US 12,543,714 B2
(45) Date of Patent: Feb. 10, 2026

(54) APPARATUS AND METHOD FOR GROWING ARTHROPODS, PLANT INCLUDING SAID APPARATUS

(71) Applicant: de Asmundis Green Research BV, Dworp Beersel (BE)

(72) Inventor: Fulvio Antonio De Asmundis, Codogno (IT)

(73) Assignee: de Asmundis Green Research BV, Dworp Beersel (BE)

( * ) Notice: Subject to any disclaimer, the term of this patent is extended or adjusted under 35 U.S.C. 154(b) by 321 days.

(21) Appl. No.: 18/324,553

(22) Filed: May 26, 2023

(65) Prior Publication Data

US 2023/0380392 A1 Nov. 30, 2023

(30) Foreign Application Priority Data

May 31, 2022 (IT) ........................ 102022000011567

(51) Int. Cl.
*A01K 67/366* (2025.01)
*A01K 67/36* (2025.01)

(52) U.S. Cl.
CPC ............ *A01K 67/36* (2025.01); *A01K 67/366* (2025.01)

(58) Field of Classification Search
CPC ..... A01K 67/36; A01K 67/362; A01K 67/364
See application file for complete search history.

(56) References Cited

U.S. PATENT DOCUMENTS

| | | | |
|---|---|---|---|
| 3,625,185 A * | 12/1971 | Kester | A01K 1/031 119/58 |
| 3,635,816 A | 1/1972 | Golub | |
| 3,965,509 A * | 6/1976 | Barber | A01K 67/30 449/56 |
| 5,087,353 A | 2/1992 | Todd et al. | |
| 2004/0144328 A1* | 7/2004 | Bonner | A01K 1/032 119/455 |
| 2015/0296760 A1* | 10/2015 | Perednia | A01K 67/30 119/6.5 |
| 2018/0064079 A1* | 3/2018 | Hasa | A01K 67/30 |
| 2018/0065152 A1* | 3/2018 | Hasa | B07B 1/24 |
| 2021/0000090 A1* | 1/2021 | Jansen | A01K 67/30 |
| 2021/0235675 A1 | 8/2021 | Riihimaa | |
| 2022/0295741 A1* | 9/2022 | Southwell | A01K 1/031 |
| 2023/0380392 A1* | 11/2023 | De Asmundis | A01K 67/30 |

FOREIGN PATENT DOCUMENTS

| | | | | |
|---|---|---|---|---|
| CN | 104322462 A | * | 2/2015 | ............ A01K 67/30 |
| CN | 104430186 A | * | 3/2015 | ............ A01K 67/30 |
| CN | 104472392 A | * | 4/2015 | ............ A01K 15/02 |
| CN | 104719245 A | * | 6/2015 | ............ A01K 67/30 |

(Continued)

OTHER PUBLICATIONS

Italian Search Report for IT202200011567 dated Jan. 4, 2023, 7 pages.

*Primary Examiner* — Morgan T Jordan
(74) *Attorney, Agent, or Firm* — Nixon & Vanderhye P.C.

(57) ABSTRACT

An apparatus for growing arthropods including a case where a plurality of cells are housed. Each cell includes a hollow body defining a compartment configured for containing a substrate for supporting arthropods. Each cell, in an engagement condition with the case, rotates with respect to the case for mixing the substrate.

15 Claims, 7 Drawing Sheets

(56) References Cited

FOREIGN PATENT DOCUMENTS

| CN | 104756954 | A | * | 7/2015 | ............. A01K 67/30 |
| CN | 105028335 | A | * | 11/2015 | ............. A01K 67/30 |
| CN | 106614402 | A | * | 5/2017 | ............. A01K 67/30 |
| CN | 107646799 | A | * | 2/2018 | ............. A01K 67/30 |
| CN | 108496831 | A | * | 9/2018 | ................ A01K 1/03 |
| CN | 108887237 | A | * | 11/2018 | ............. A01K 67/30 |
| CN | 110558240 | A | * | 12/2019 | ............. A01K 1/031 |
| CN | 213187733 | | | 5/2021 | |
| CN | 114831034 | A | * | 8/2022 | ............. A01K 1/035 |
| CN | 115336539 | A | * | 11/2022 | ........... A01K 29/005 |
| CN | 116261947 | A | * | 6/2023 | ............. A01K 67/30 |
| DE | 202008014558 | U1 | * | 3/2009 | ................ A01K 1/03 |
| DE | 102022128970 | B3 | * | 4/2024 | ............. A01K 67/36 |
| DE | 102023116379 | A1 | * | 12/2024 | ............. A01K 67/30 |
| EP | 2820950 | A1 | * | 1/2015 | ........... A01M 9/003 |
| ES | 2551279 | A1 | * | 11/2015 | ............. A01K 67/30 |
| GB | 2397482 | A | * | 7/2004 | ............. A01K 67/30 |
| KR | 20170110974 | A | * | 10/2017 | ........... A01K 67/033 |
| KR | 20200100467 | A | * | 8/2020 | ............. A01K 67/30 |
| KR | 102207748 | B1 | * | 1/2021 | ............. A01K 67/30 |
| KR | 20220070695 | A | * | 5/2022 | ............. A01K 67/30 |
| KR | 20220070696 | A | * | 5/2022 | ............. A01K 67/30 |
| KR | 20220168779 | A | * | 12/2022 | ........... A01K 67/033 |

* cited by examiner

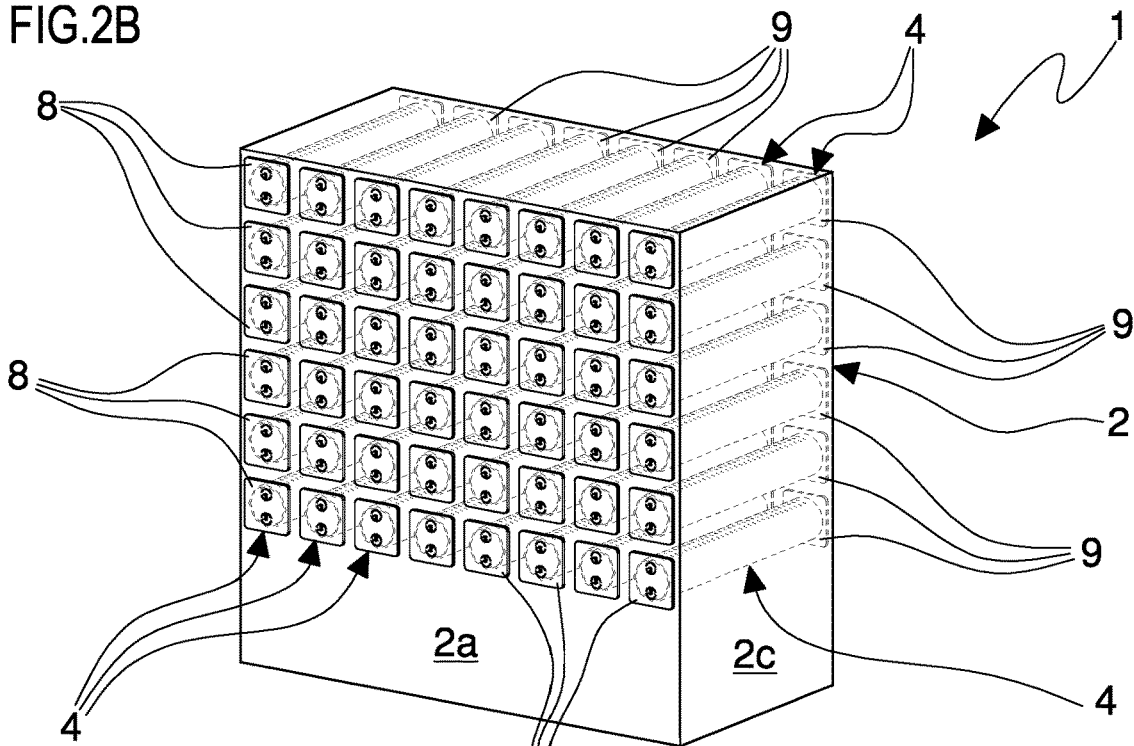

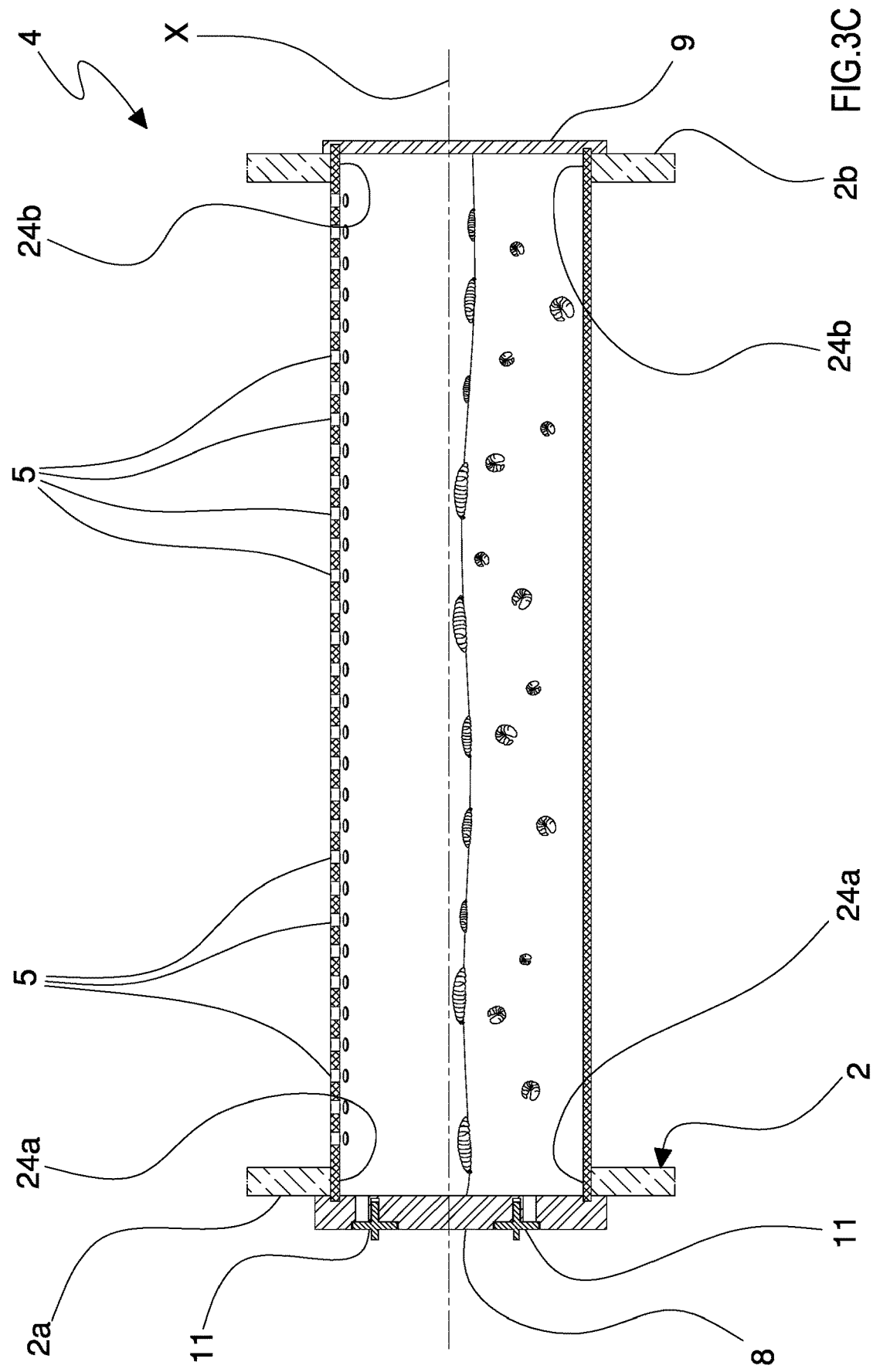

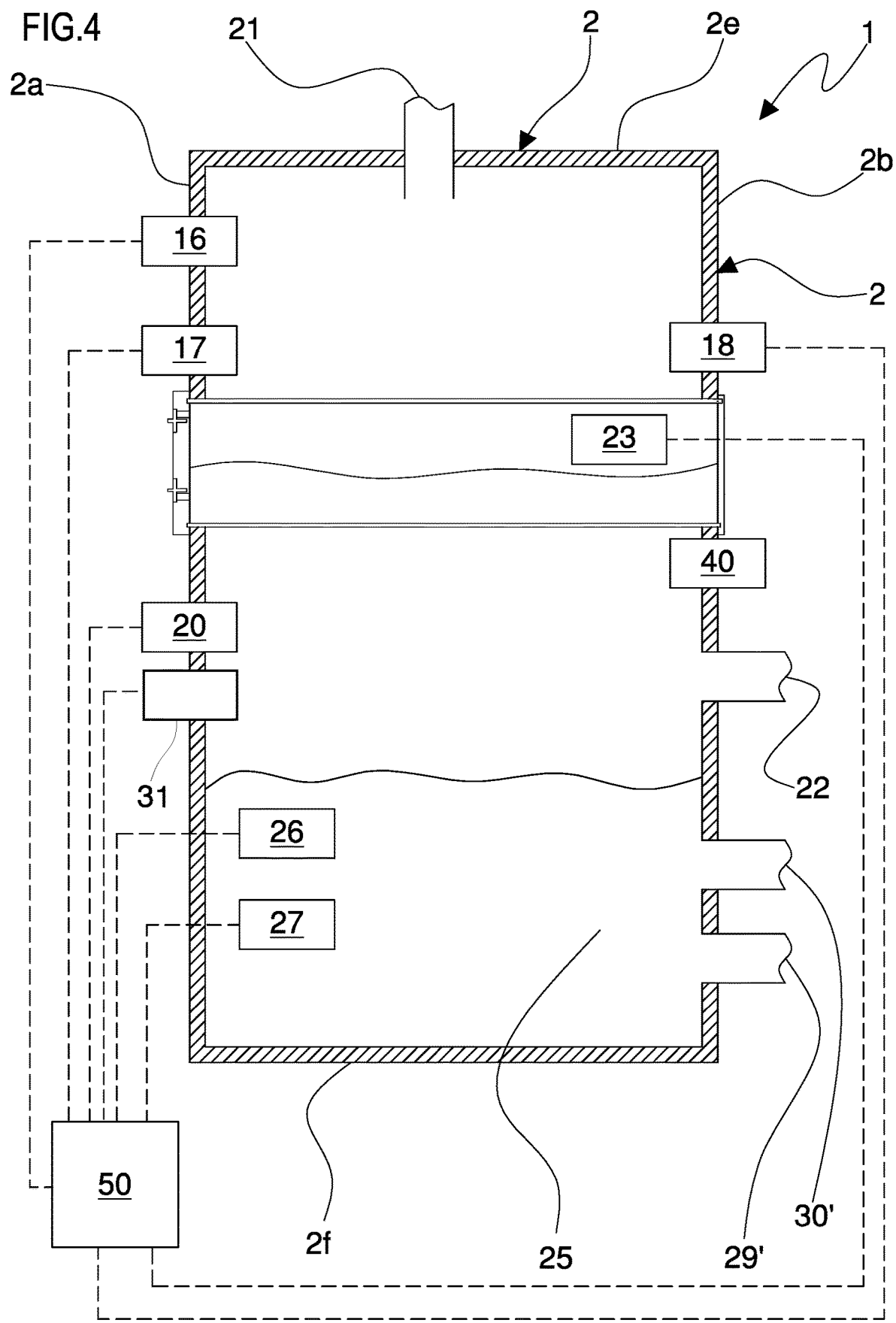

APPARATUS AND METHOD FOR GROWING ARTHROPODS, PLANT INCLUDING SAID APPARATUS

RELATED APPLICATION

This application in corporates by reference and claims priority to Italian Patent Application 102022000011567 filed May 31, 2022.

FIELD OF THE INVENTION

The present invention is an apparatus and a method for growing arthropods, as well as a plant comprising said apparatus usable for growing animals and/or plant species, e.g., insects and algae. The present invention may find application in the field of breeding arthropods, e.g., insects or insect larvae, for the production of animal protein.

BACKGROUND

Apparatuses for growing animals and/or plant species using substances or gases derived from the treatment of sludge or wastewater, civil and/or industrial, are known.

U.S. Pat. No. 3,635,816A describes an apparatus that derives nutrients for the growth of animal species from the treatment of a dirty solution. The apparatus features treatment tanks containing a sandy substrate populated by worms allowing the solution to be filtered by assimilation of contaminants; the cleaned solution is then sent to collection tanks for the growth of algae and fish under hydroponic conditions.

Another example of an apparatus for treating dirty substances for the growth of animal or plant species, is described in U.S. Pat. No. 5,087,353A. The apparatus includes a treatment tank for dirty substances comprising air nozzles to oxidize organic matter in the tank and extract gases subsequently piped into specific containers to promote algae growth. The apparatus includes additional tanks connected to the containers and configured to receive oxygen produced by the algae to promote the growth of fish and shellfish.

A further example of apparatus for growing insect is described in the Chinese Utility Model No. CN213187733U, which shows a plurality of sliding drawers which, in an engaging condition with the case, are fixed and stably locked with respect to the case.

A further example of an apparatus for growing insect is described in U.S. Patent Application No. US2021/235675A1, which shows a rotating case in which a plurality of shelves are hinged to support insect larvae.

Although the solutions described above allow the growth of insects, the Applicant noted that these solutions can be improved in several aspects.

SUMMARY

The present invention may be embodied to solve at least one of the drawbacks and/or limitations of the preceding solutions.

The present invention may be embodied to provide an apparatus suitable for enabling efficient and rapid growth of arthropods. It is then an object of the present invention to provide an apparatus having a simple and compact structure, suitable for maximizing the space available for growing arthropods, while maintaining small footprints. A further purpose of the present invention is to provide an apparatus and method for growing arthropods able to minimize the emission of pollutants into the atmosphere.

The invention may be embodied as an apparatus for growing arthropods including:

A case (2) having a predetermined number of walls delimiting an inner volume,

A plurality of cells (4) engaged to the case (2) and housed at least partially in the inner volume, each cell (4) comprising a hollow body defining a compartment configured for containing a predetermined amount of a substrate for supporting arthropods.

In one aspect according to the preceding aspect the substrate comprises an inert material. In an aspect according to any one of the preceding aspects at least part of each cell (4), in an engagement condition with the case (2), is movable with respect to the case (2). In an aspect according to any one of the preceding aspects each cell is movable with respect to the case (2) for mixing the substrate. In an aspect according to any one of the preceding aspects each cell (4) has a tubular conformation. In an aspect according to any one of the preceding aspects each cell has an elongated shape. In an aspect according to any one of the preceding aspects each cell has, according to a cross section, a circular shape. In an aspect according to any one of the preceding aspects at least the hollow body of each cell has an elongated shape having, according to a cross section, a substantially circular outline. In an aspect according to any one of the preceding aspects each cell (4) has a constant cross-section along its development. In an aspect according to any one of the preceding aspects at least part of each cell (4), optionally the hollow body, is removably engaged to the case (2). In an aspect according to any one of the preceding aspects at least the hollow body of each cell (4) is movable by rotation about an axis of rotation (X). In an aspect according to any one of the preceding aspects the hollow body of each cell (4), in an engagement condition with the case (2) (optionally when said cell is in the inner volume of the case), is movable with respect to said case. In an aspect according to any one of the preceding aspects, the hollow body of each cell (4), in an engagement condition with the case (2) (optionally when said cell is housed in the inner volume of the case), is movable by rotation about an axis of rotation (X). In an aspect according to any one of the preceding aspects, the case, optionally in use, is fixed. In an aspect according to any one of the preceding aspects the case, in use, is fixed with respect to the ground. In an aspect according to any one of the preceding aspects each cell (4) is movable with respect to the case (2), optionally said case is fixed. In an aspect according to any one of the preceding aspects each cell, placed in the inner volume of said case, is rotatable with respect to said case.

In an aspect according to any one of the preceding aspects the hollow body of each cell (4) extends along a development direction between a first and a second longitudinal end, wherein each cell (4) is engaged to the case (2) at said first and second longitudinal ends. In an aspect according to any one of the preceding two aspects, the axis of rotation (X) of rotation of each cell (4) is substantially parallel to the development direction of said cell (4). In an aspect according to the preceding aspect the axis of rotation (X) of rotation of each cell (4) is defined in the compartment of the cell (4) itself. In an aspect according to any one of the preceding aspects the axis of rotation (X) of rotation of each cell (4) is substantially coincident with the center of the hollow body section of the cell (4) itself. In an aspect according to any one of the preceding aspects, the axis of rotation (X) of rotation of each cell (4), in use conditions of the apparatus, is horizontal.

In one aspect according to any one of the preceding aspects each cell (4) swings between a first and a second limit position. In one aspect according to the preceding aspect each cell (4) swings about a respective axis of rotation (X) of rotation. In one aspect according to the two preceding aspects each cell (4) swings at a frequency comprised between 0.01 Hz and 0.5 Hz. In one aspect according to any one of the preceding aspects the first and second limit positions are angularly offset by an angle comprised between 60° and 140°. In one aspect according to the preceding aspect, the angular offset of a cell (4) corresponds to an internal angle subtended between two lines respectively passing through the axis of rotation (X) of rotation of said cell (4) and a same point of the cell (4) itself in the respective first and second limit positions. In one aspect according to the two preceding aspects the first and second limit positions are angularly offset from each other in view along the axis of rotation (X) of rotation of the cell (4). In an aspect according to any one of the preceding aspects each cell (4) of said plurality is movable by rotation about its own axis of rotation (X). In one aspect according to any one of the preceding aspects the axes (X) of rotation of the plurality of cells are parallel to each other.

In an aspect according to any one of the preceding aspects, the hollow body of each cell (4) has a plurality of through holes (5) configured to place the inner volume of the case (2) in communication with the compartment of the hollow body of the cell (4). In an aspect according to the preceding aspect the plurality of holes (5) of a cell is uniformly distributed at least along a direction substantially parallel to the axis of rotation (X) of rotation of the cell itself. In an aspect according to any one of the preceding aspects, the plurality of holes (5) comprises at least two sets of holes (5), each set of holes (5) comprising a predetermined number of holes (5) aligned along a direction substantially parallel to the axis of rotation (X) of rotation of the cell (4). In an aspect according to the preceding aspect each set of holes (5) comprising a number of holes greater than 50, optionally comprised between 100 and 500. In an aspect according to any one of the preceding aspects the hollow body of each cell has a total number of holes (5) greater than 50, optionally comprised between 100 and 500. In an aspect according to any one of the preceding aspects each hole (5) of said plurality has a through section comprised between 50 mm$^2$ and 180 mm$^2$.

In one aspect according to any one of the preceding aspects each hole (5) of said plurality defines a passage opening greater than 19 mm$^2$, optionally comprised between 50 mm$^2$ and 180 mm$^2$.

In an aspect according to any one of the preceding aspects, the plurality of holes (5) is defined, in use (optionally in the absence of relative movement between the cell and the case), at a portion of the top of the hollow body. In an aspect according to any one of the preceding aspects, the hollow body of each cell (4) has a predetermined length defined by the distance present between the first and second longitudinal ends and a predetermined width, wherein the ratio of the length to the width of each cell (4) is greater than 2, optionally equal to or greater than 3, even more optionally between 4 and 10. In an aspect according to any one of the preceding aspects, each cell (4) has a width, optionally a diameter, comprised between 100 mm and 500 mm. In an aspect according to any one of the preceding aspects each cell (4) has a length comprised between 1000 mm and 6000 mm.

In an aspect according to any one of the preceding aspects, the apparatus comprises a movement assembly (6) configured to allow the movement, optionally rotation, of the hollow body of a respective cell (4). In an aspect according to the preceding aspect the movement assembly (6) is configured to allow simultaneous rotation of a plurality of hollow bodies of respective cells (4). In an aspect according to the preceding two aspects, the apparatus includes a movement assembly (6) for each cell. In an aspect according to the three preceding aspects, the movement assembly (6) has at least one rotating element (7) engaged to the case (2) in the inner volume and placed in contact with an outer surface of the hollow body of the respective cell (4) for allowing its movement, optionally by rotation.

In an aspect according to any one of the preceding aspects, the movement assembly is active on a single cell (4) and comprises a plurality of rotating elements (7) each placed in contact with the outer surface of the hollow body of the respective cell (4). In an aspect according to the preceding aspect at least one of said rotating elements (7) of the movement assembly (6) is motorized. In an aspect according to any one of the preceding aspects, the number of rotating elements (7) of the movement assembly (6) active on each cell (4) is greater than 2, optionally comprised between 3 and 5.

In an aspect according to any one of the preceding aspects the at least one movement assembly (6) comprises an actuator, for example an electric motor, active on a rotating element (7) of a cell for allowing its movement, optionally rotation. In an aspect according to any one of the preceding aspects, the apparatus comprises a transmission configured to connect in motion a plurality of cells (4).

In an aspect according to any one of the preceding aspects, the apparatus comprises a control unit (50) active in control on said actuator and configured to perform a movement cycle comprising at least one step of commanding the activation of the actuator to move the cell (4) with respect to the case. In an aspect according to the preceding aspect, the control unit is configured to execute the movement cycle at predetermined time intervals or upon receipt of a command signal. In one aspect according to the preceding two aspects, the time between one movement cycle and a subsequent movement cycle is comprised between 18 hours and 30 hours. In one aspect according to any one of the preceding three aspects, the duration of a single movement cycle is comprised between 7 seconds and 30 seconds.

In an aspect according to any one of the preceding aspects each rotating element (7) of the movement assembly (6) active on a cell, comprises a roller (7a) extending along a respective axis (Y) parallel to the axis of rotation (X) of rotation of the cell (4) itself. In an aspect according to any one of the preceding aspects, the rotating elements (7) of the movement assembly (6) active on a cell (4), are equidistant from each other.

In an aspect according to any one of the preceding aspects, the hollow body of each cell (4) has a circular section inscribed in an ideal square, wherein the apparatus includes at least one rotating element (7), optionally a roller (7a), at each vertex of said ideal square.

In one aspect according to any of the three preceding aspects each roller (7a) extends along a full length of the hollow body of the cell (4) to which said roller is directly in contact.

In an aspect according to any one of the preceding aspects the hollow body of each cell (4) has, at the first and second longitudinal ends, respective passage openings in communication with the compartment. In an aspect according to the preceding aspect each cell (4) includes a front plate (8) and a back plate (9) respectively engaged at the first and second longitudinal ends of the respective hollow body in occlusion of the passage openings.

In an aspect according to any one of the preceding two aspects, each cell (4) has at least one through opening (10) defined on the front plate (8), configured to allow communication between the compartment of the hollow body and the external environment. In an aspect according to the preceding aspect, each cell has at least one selector (11) carried by the front plate (8) and arranged in the proximity of the through opening (10), said selector (11) being movable with respect to the hollow body at least between:

a first operating position where the selector (11) is superimposed to the through opening (10) of the front plate (8) to prevent communication between the external environment and the compartment of the hollow body, a second operating position where the selector (11) allows the communication between the external environment and the compartment of the hollow body.

In one aspect according to the preceding aspect the selector (11) has a plate shape. In an aspect according to any one of the preceding aspects the selector (11) includes a respective through opening (12). In an aspect according to the preceding aspect the through opening (12) of the selector (11), in the first operating position, is offset and spaced apart of through opening (10) of the front plate (8). In an aspect according to any one of the preceding two aspects, the through opening (12) of the selector, in the second operating position, is at least partially facing the through opening (10) of the front plate (8). In an aspect according to any one of the preceding aspects the through opening (10) of the front plate (8) is delimited by a closed perimeter edge, optionally having a circular profile. In an aspect according to any one of the preceding aspects the through opening (10) of the front plate (8) is substantially identical in shape, optionally in shape and size, to the through opening (12) of the selector (11). In an aspect according to any one of the preceding aspects, the selector (11) is movable by rotation with respect to the front plate (8), about an axis substantially parallel to the axis of rotation of the cell (4) directly carrying said selector (11). In an aspect according to any one of the preceding aspects, the through opening (10) of the front plate (8) of each cell (4) has a cross section greater than 300 mm², optionally comprised between 500 mm² and 2000 mm². In an aspect according to any of the above aspects the through opening (10) of the front plate (8) of each cell (4) is configured to allow the passage of the substrate. In an aspect according to any one of the preceding aspects, the through opening (10) of the front plate (8) of each cell (4) is arranged, in use conditions (optionally in conditions of no relative movement between said cell and the case), at a bottom portion of the cell (4). In an aspect according to any one of the preceding aspects, the through opening of the selector is placed, in use, below an ideal horizontal centerline plane of the hollow body of the cell (4) to which said selector is associated.

In an aspect according to any one of the preceding aspects each cell (4) has at least one auxiliary through opening (10') defined on the front plate (8), configured to allow communication between the compartment of the hollow body and the external environment.

In an aspect according to any one of the preceding aspects each cell (4) includes at least one auxiliary selector (11') carried by the front plate (8) in proximity of the auxiliary through opening (10'), said auxiliary selector (11') being movable with respect to the hollow body at least between:

a first operating position where the auxiliary selector (11') is superimposed to the auxiliary through opening (10') of the front plate (8) to prevent communication between the external environment and the compartment of the hollow body, a second operating position where the auxiliary selector (11') allows the communication between the external environment and the compartment of the hollow body.

In one aspect according to the preceding aspect the auxiliary selector (11') has a plate shape. In an aspect according to any one of the preceding two aspects the auxiliary selector includes a respective auxiliary through opening (12'). In an aspect according to the preceding aspect the auxiliary through opening (12'), in the first operating position of the auxiliary selector (11'), is offset and spaced apart of the auxiliary through opening (10') of the front plate (8). In an aspect according to any one of the preceding two aspects, the auxiliary through opening (12'), in the second operating position of the auxiliary selector (11'), is at least partially facing the auxiliary through opening (10') of the front plate (8). In an aspect according to any one of the preceding aspects the auxiliary through opening (10') of the front plate (8) is delimited by a closed perimeter edge, optionally having a circular profile. In an aspect according to any one of the preceding aspects the auxiliary through opening (10') of the front plate (8) is substantially identical in shape, optionally in shape and size, to the auxiliary through opening (12') of the auxiliary selector (11'). In an aspect according to any one of the preceding aspects, the auxiliary selector (11') is movable by rotation with respect to the front plate (8) about an axis substantially parallel to the axis of rotation of the cell (4) directly carrying said auxiliary selector (11').

In one aspect according to any one of the preceding aspects, the auxiliary through opening (10') of the front plate (8) of each cell (4) has a cross section greater than 300 mm², optionally comprised between 500 mm² and 2000 mm².

In an aspect according to any one of the preceding aspects the auxiliary through opening (10') of the front plate (8) of each cell (4) is configured to allow the passage of the substrate. In an aspect according to any one of the preceding aspects the auxiliary through opening (10') of the front plate (8) of each cell (4) is arranged, in use conditions (optionally in conditions of no relative movement between said cell and the case), at a top portion of the cell (4). In an aspect according to any one of the preceding aspects, the auxiliary through opening (10') of each cell (4) is placed, in a stationary condition of said cell (4), above an ideal horizontal centerline plane of the hollow body. In an aspect according to any one of the preceding aspects the auxiliary through opening (10') of each cell (4) is placed, in use, above an ideal horizontal centerline plane of the hollow body.

In an aspect according to any one of the preceding aspects the auxiliary through opening (12') of the auxiliary selector (11') is opposite to the through opening (10') of the front plate (8). In an aspect according to any one of the preceding aspects the auxiliary through opening (12') of the auxiliary selector (11') and the through opening (10') of the front plate (8) are symmetrical to each other with respect to the ideal horizontal centerline plane of the hollow body, optionally if there is no relative movement between said cell and the case. In an aspect according to any one of the preceding aspects, the selector (11) and the auxiliary selector (11') are independently movable relative to each other with respect to the hollow body of the cell (4).

In an aspect according to any one of the preceding aspects, the apparatus includes a hopper (13) engaged in the compartment of the hollow body. In an aspect according to the preceding aspect the hopper (13) is configured to pour the substrate into the hollow body. In an aspect according to any one of the preceding aspects the hopper (13) is arranged at the auxiliary through opening (10') of the front plate (8) and configured to receive a predetermined amount of substrate to be poured into the hollow body.

In an aspect according to any one of the preceding three aspects the hopper (13) comprises an elongated hollow body extending in length along a direction (A) parallel to the extension direction of the hollow body. In an aspect according to any one of the four preceding aspects, the hopper (13) has at least one longitudinal passageway (14) facing the auxiliary through opening (10') of the front plate (8), said longitudinal passageway (14) being configured to allow substrate to be fed into the hopper (13). In one aspect according to any one of the preceding aspects, the hopper (13) has, in a cross section along a plane orthogonal to the extension direction of the hopper (13), a substantially "C" or "V" or "U" shape.

In an aspect according to any one of the preceding aspects the hopper (13) is movable by rotation with respect to the hollow body of the cell (4) about an axis (Z) substantially parallel to the axis of rotation (X) of rotation of the hollow body of said cell. In one aspect according to the preceding aspect the hopper (13) is movable at least between:

a loading position where the hopper (13) has concavity facing a top portion of the hollow body and is configured to receive a predetermined amount of substrate, a discharge position where the hopper (13) is configured to pour the substrate in the hollow body.

In an aspect according to any one of the preceding aspects each cell (4) is engaged to the case (2) by means of the front plate (8) and back plate (9), optionally by means of screws. In an aspect according to any one of the preceding aspects the front plate (8) and the back plate (9) of each cell (4) have a blind groove (15) suitable for receiving in engagement the hollow body of said cell (4).

In an aspect according to any one of the preceding aspects, the apparatus includes at least one temperature sensor (16) placed in the inner volume of the case (2) and configured to generate a signal representative of a temperature inside the case (2).

In an aspect according to the preceding aspect, the apparatus comprises a plurality of temperature sensors (16) each of which is placed in the compartment of a respective cell (4), wherein each of said sensors is configured to generate a respective signal representative of a temperature inside the compartment of a respective cell (4).

In one aspect according to any one of the preceding two aspects, the apparatus includes a control unit (50) connected to each temperature sensor (16) and configured for:

receiving the signal from the temperature sensor (16), estimating, according to said signal, a temperature value in the inner volume, optionally in the compartment of the respective cell (4).

In one aspect according to the preceding aspect, the control unit (50) is configured for:

comparing the estimated temperature value with a threshold temperature value, in case said estimated temperature value exceeds the threshold temperature value, performing at least one of said operations:

a. commanding a movement of the cells (4), optionally an oscillation of the cells (4) around the axis of rotation (X), b. emitting an alarm signal to alert a user of a failure condition of the apparatus.

In one aspect according to the preceding aspect, the threshold temperature value is comprised between 25° C. and 35° C.

In an aspect according to any one of the preceding aspects, the apparatus includes a thermoregulation device (20), optionally a heat exchanger, configured to deliver gas, optionally air, into the inner volume of the case (2). In an aspect according to the preceding aspect the thermoregulation device (20) is configured to supply gas at a temperature comprised between 5° C. and 55° C.

In one aspect according to any one of the preceding aspects, the control unit (50) is connected to the thermoregulation device (20) and configured for:

comparing the estimated temperature value with the threshold temperature value, in case said estimated temperature value exceeds the threshold temperature value, performing at least one of said operations:

a. commanding a movement of one or more cells (4), optionally an oscillation of the cells (4) around the axis of rotation (X), b. emitting an alarm signal to alert a user of a failure condition of the apparatus, c. controlling the activation of the thermoregulation device (20) for blowing gas into the inner volume of the case (2).

In one aspect according to the preceding aspect, the threshold temperature value is comprised between 25° C. and 35° C.

In an aspect according to any one of the preceding aspects, the apparatus includes at least one gas sensor (18) located in the inner volume of the case (2), said gas sensor (18) being configured to generate a signal representative of a control parameter comprising at least one of the following parameters:

an amount of oxygen, a percentage of oxygen with respect to an air composition in the compartment of the cell (4), an amount of carbon dioxide, a percentage of carbon dioxide with respect to a composition of air in the compartment of the cell (4).

In an aspect according to any one of the preceding aspects, the apparatus comprises a plurality of gas sensors (18) each of which is placed in the compartment of a respective cell (4), wherein each of said sensors is configured to generate a signal representative of a control parameter relating to the environment within the cell (4), wherein said control parameter comprises at least one of the following parameters:

an amount of oxygen, a percentage of oxygen with respect to an air composition present in the environment inside the cell (4), an amount of carbon dioxide, a percentage of carbon dioxide with respect to a composition of air present in the environment inside the cell (4).

In one aspect according to any one of the preceding two aspects the apparatus includes a control unit (50) connected to the gas sensor (18) and configured for:
receiving the signal from the gas sensor (18),
estimating, according to said signal, a gas value in the inner volume, optionally in the compartment of the respective cell (4).

In an aspect according to the preceding aspect, the control unit (50) is configured to control the movement of one or more cells (4) with respect to the case (2) in case where the value of the control parameter exceeds the value of a threshold control parameter. In an aspect according to the preceding aspect said threshold control parameter includes at least one of:
a percentage of oxygen present in an air composition in the inner volume of the case (2), or
a percentage of carbon dioxide present in an air composition in the inner volume of the case (2).

In an aspect according to the preceding aspect, the threshold control parameter includes an amount of oxygen percentage of an air composition present in the inner volume of the case. In one aspect according to the preceding aspect the value of the threshold parameter is 20%.

In an aspect according to any one of the preceding three aspects the threshold control parameter comprises an amount of carbon dioxide percentage of an air composition present in the inner volume. In an aspect according to the preceding aspect the value of the threshold parameter is 0.05%.

In one aspect according to any one of the preceding aspects the apparatus includes:
a gas delivery manifold (21) connected to the case (2) and configured for allowing the delivery of gas, such as oxygen, from an external environment,
a gas return manifold (22) connected to the case (2) and configured for allow the ejection of gas from an environment inside the case (2).

In one aspect according to the preceding aspect, the apparatus includes a control unit (50) operatively active on the gas delivery manifold (21) and configured for commanding the introduction of gas, optionally oxygen, if the measured gas values detected by the gas sensor (18) are below the value of the threshold control parameter.

In an aspect according to any one of the preceding aspects, the control unit (50) is operatively active on the gas return manifold (22) and configured for commanding the ejection of gas, optionally carbon dioxide, if the measured gas values detected by the gas sensor (18) are below a value of a/the threshold control parameter.

In an aspect according to any one of the preceding aspects, the apparatus comprises at least one gas pressure sensor (31) placed in the inner volume of the case (2) and configured for generating a signal representative of a pressure inside the case (2). In an aspect according to any one of the preceding aspects, the apparatus comprises a plurality of gas pressure sensors (31) each of which is placed in the compartment of a respective cell (4), wherein each of said sensors is configured for generating a signal representative of a gas pressure in to the compartment of a respective cell (4).

In one aspect according to any of the two preceding aspects, the apparatus includes a control unit (50) operatively connected to the gas pressure sensor (31) and configured for:
receiving the signal from the pressure sensor (31),
estimating, based on said signal, a pressure value in the inner volume, optionally in the compartment of the respective cell (4).

In an aspect according to the preceding aspect, the control unit (50) is configured for controlling the delivery or ejection of gas respectively via the gas delivery manifold (21) or the gas return manifold (22), if said measured pressure values detected by the pressure sensor (31) are different from a value of a threshold pressure parameter. In an aspect according to the preceding aspect, the value of the threshold pressure parameter is comprised between 0.8 bar and 1.5 bar, optionally comprised between 1 bar and 1.2 bar.

In an aspect according to any one of the preceding aspects the apparatus comprises at least one humidity sensor (17) placed in the inner volume of the case (2) and configured for generating a signal representative of a relative humidity within the case (2). In an aspect according to any one of the preceding aspects, the apparatus comprises a plurality of humidity sensors (17) each of which is placed in the compartment of a respective cell (4), wherein each of said sensors is configured for generating a signal representative of a relative humidity inside the compartment of a respective cell (4). In an aspect according to any one of the preceding two aspects, the apparatus comprises a control unit (50) operatively connected to the humidity sensor (17) and configured for:
receiving the signal from the humidity sensor (17),
estimating, according to said signal, a relative humidity value in the inner volume, optionally in the compartment of the respective cell (4).

In one aspect according to the preceding aspect, the control unit (50) is configured for controlling the delivery or ejection of gas respectively via the gas delivery manifold (21) or the gas return manifold (22), if said measured pressure values detected by the pressure sensor (18) exceed a predetermined value of a threshold relative humidity parameter. In an aspect according to the preceding aspect, the value of the threshold relative humidity parameter is comprised between 40% and 50%.

In an aspect according to any one of the preceding aspects, the apparatus comprises at least one camera (23) insertable into the compartment of each cell (4) and configured to generate a video signal representative of a scene within the compartment. In an aspect according to any one of the preceding aspects, the apparatus includes a control unit (50) connected to the at least one camera (23) and configured for performing a control procedure comprising the steps of:
receiving the video signal from the camera (23),
determining at least one image representative of the scene inside the compartment,
detecting, within said image, the presence of at least one arthropod, optionally an insect or insect larva,
determining at least one value of a growth parameter of said arthropod, optionally of said insect or insect larva,
comparing said value of growth parameter with at least one benchmark parameter,
according to said comparison, emitting a command signal for the extraction of said arthropods from the cell (4).

In an aspect according to the preceding aspect, the growth parameter includes at least one of the following values:
a length of one or more arthropods,
a ratio between a footprint of arthropods and the footprint of the substrate,
a ratio between the volume of arthropods and a volume of the substrate.

In an aspect according to any one of the preceding two aspects if the estimated values of arthropod growth are equal to or greater than the benchmark parameter, the control procedure includes a step of ejecting the substrate from a respective cell (4). In one aspect according to any one of the preceding aspects the predetermined number of walls of the case (2) includes:
- a front wall (2a),
- a rear wall (2b) opposed to the front wall (2a),
- a first side wall (2c) connecting the front wall (2a) and rear wall (2b),
- a second side wall (2d) opposed to the first side wall (2c) and also connecting the front (2a) and back (2b) walls,
- a top wall (2e) superiorly delimiting the inner volume,
- a bottom wall (2f) inferiorly delimiting the inner volume opposite to the top wall (2e).

In an aspect according to any one of the preceding aspects at least the front wall (2a) has a plurality of accesses (24a) each of which is suitable for allowing the passage of at least one cell (4) for at least partially housing the latter in the inner volume of the case. In an aspect according to any one of the preceding two aspects, the rear wall (2b) has a plurality of accesses (24b) each of which is suitable for allowing the passage of a cell (4) for at least partially housing the latter in the inner volume of the case, wherein the accesses of the rear wall (2b) are equal in number to the accesses on the front wall (2a). In an aspect according to any one of the preceding three aspects each cell (4) of said plurality is engaged to the front wall (2a) and the rear wall (2b) of the case (2) respectively by means of the front plate (8) and the back plate (9). In an aspect according to any one of the preceding aspects each cell (4) extends from the front wall (2a) to the rear wall (2b) of the case (2) according to a direction orthogonal to said front wall and rear wall (2a, 2b). In an aspect according to any one of the preceding aspects each front plate (8) occludes a respective access (24a) of the front wall (2a) of the case (2), and wherein each rear plate (9) occludes a respective access (24b) of the rear wall of the case (2).

In an aspect according to any one of the preceding aspects, the rear wall (2f), in cooperation with respective portions of the front wall (2a), rear wall (2b), and side walls (2c, 2d) in proximity of the rear wall (2f), defines a collections tank (25) configured for collecting at least one fluid, e.g., water, for allowing solubilization of gas, e.g., carbon dioxide, present in the environment within the case (2).

In an aspect according to any one of the preceding aspects, the apparatus comprises a mixing device (26) active in the collection tank (25) and configured for moving the fluid contained in said collection tank (25). In an aspect according to the preceding aspect a/the control unit (50) is connected to said mixing device (26), which is configured for operating at least between:
- an active condition in which it moves the fluid present in the collection tank (25),
- a disabled condition in which it does not operate on the fluid in the collection tank (25).

In an aspect according to any one of the preceding aspects, the apparatus includes at least one pH sensor (27) active in the collection tank (25). In an aspect according to the preceding aspect, the pH sensor (27) is configured to generate a signal representative of pH of the fluid in the collection tank (25) itself.

In one aspect according to any one of the preceding two aspects a/the control unit (50) is operatively connected to the pH sensor (27) and configured to:

receiving the signal from the pH sensor (27),
estimating, as a function of said signal, a pH value of the fluid in the collection tank (25).

In one aspect according to any one of the preceding five aspects, a/the control unit (50) is operatively connected to the mixing device (26) and configured for commanding its active condition if said measured pH values detected by the pH sensor (27) exceed a predetermined threshold pH value comprised between 4.5 and 5.

A further aspect provides a plant for growing arthropods comprising:
- at least one oxygenator (101) configured for generating a predetermined amount of oxygen,
- an apparatus (1) for growing arthropods according to any one of the preceding aspects, said apparatus being connected to the oxygenator (101) and configured to receive a predetermined amount of oxygen from the oxygenator (101).

In an aspect according to the preceding aspect, the plant includes a fluid delivery line (30) connecting the oxygenator (101) with the collection tank (25). In an aspect according to the preceding aspect, the fluid delivery line (30) is connected to the collection tank (25) via the fluid delivery manifold (30'). In an aspect according to any one of the preceding aspects the fluid delivery line (30) is configured to deliver a flow of fluid containing oxygen from the oxygenator to the collection tank (25).

In one aspect according to any one of the two preceding aspects the oxygenator (101) includes an algae container for containing algae within an aqueous solution.

In one aspect according to any one of the preceding aspects, the facility comprises a wastewater container (102) for treating a dirty solution, e.g., sewage, configured for extracting gases from said dirty solution, wherein said gases are at least one of: Carbon Dioxide $CO_2$, Carbon Monoxide CO, Nitrogen Oxides $NO_x$, Sulfur Oxides $SO_x$, Volatile Carbon Complexes VOC.

In an aspect according to any one of the preceding plant aspects, the plant includes a fluid return line (29) that connects the oxygenator (101) with the collection tank (25). In an aspect according to any one of the preceding aspects, the fluid return line (29) is configured to allow fluids to flow between the collection tank (25) and the oxygenator (101).

In an aspect according to any one of the preceding aspects, the plant includes a gas distribution line (103) that connects an environment within the wastewater container (102) with an environment within the oxygenator (101). In an aspect according to the preceding aspect, the gas distribution line (103) is configured to allow gas to flow between the wastewater container (102) and the oxygenator (101).

In an aspect according to any one of the preceding plant aspects, the plant includes a fish breeding tank (104) for promoting fish growth. In an aspect according to the preceding aspect, the plant includes a gas inlet line (105) that connects the apparatus (1) with the fish breeding tank (104).

In one aspect according to the preceding aspect the gas inlet line (105) is configured to connect an indoor environment to the collection tank (25) and an indoor environment to the fish breeding tank (104). In an aspect according to any one of the preceding two aspects, the gas inlet line (105) is configured to allow gas, such as carbon dioxide, to flow from the collection tank (25) to the fish breeding tank (104).

In an aspect according to aspect any of the preceding aspects, the plant includes a fluid inlet line (106) that connects the oxygenator (101) to the fish breeding tank (104). In an aspect according to the preceding aspect, the fluid inlet line (105) is configured to allow gases and/or liquids, e.g., oxygen and water, to flow from the oxygenator (101) to the fish breeding tank (104).

In an aspect according to any one of the preceding plant aspects, the plant includes a sprout container (107) to promote the growth of plant sprouts. In an aspect according to the preceding aspect, the plant includes an auxiliary fluid inlet line (108) that connects the fish breeding tank (104) to the sprout container (107). In an aspect according to the preceding aspect, the auxiliary fluid inlet line (108) is configured to allow gases and/or fluids, for example oxygen and water, to flow from the fish breeding tank (104) to the sprout container (107).

A further aspect provides a method for growing arthropods by means of an apparatus according to any of the preceding apparatus aspects. In an aspect according to the preceding aspect the method comprises the steps of:
- arranging a predetermined amount of a substrate and arthropods within each cell (4) for a predetermined growth period,
- following the predetermined growth period, extracting the containing substrate container in one or more cells (4) for withdrawal of arthropods.

In an aspect according to any one of the preceding two aspects, the method comprises a step of moving one or more cells (4) with respect to the case (2) for allowing mixing of the substrate. In an aspect according to any one of the preceding aspects, the step of moving one or more cells (4) with respect to the case (2) is performed at regular intervals. In an aspect according to any one of the preceding method aspects, the step of moving one or more cells (4) with respect to the case (2) is performed during the predetermined growth period. In an aspect according to any one of the preceding two aspects, the step of moving one or more cells (4) with respect to the case (2) comprises swinging the hollow body of each cell (4) between a first and a second limit position.

In an aspect according to any one of the preceding method aspects, the method comprises a step of extracting substrate and arthropods by the through opening of the front plate (8) of one or more cells (4). In an aspect according to any one of the preceding aspects wherein the step of extracting substrate and arthropods is performed at the end of a/the predetermined growth period.

In one aspect according to the preceding aspect, the step of extracting substrate and arthropods involves the substeps of:
- moving the selector from the closed position to the open position,
- inserting a cannula in one or more cells (4) through the through opening of the front plate (8),
- extracting, through said cannula, substrate and arthropods.

In an aspect according to any one of the preceding method aspects, the method includes a step of delivering nutrients or substrate in one or more cells (4) through the auxiliary through opening of the front plate (8).

In one aspect according to the preceding aspect, the step of delivering nutrients or substrate includes the substeps of:
- moving the auxiliary selector from the closed position to the open position,
- inserting a cannula in one or more cells (4) through the auxiliary through opening of the front plate (8),
- extracting, by means of said cannula, nutrients or substrate in a respective cell (4), optionally wherein nutrients or substrate are placed on the hopper (13).

In one aspect the preceding aspect the substep of delivering nutrients or substrate in a respective cell (4) includes the steps of:
- placing nutrients or substrate on the hopper (13),
- controlling the movement of the hopper (13) with respect to the cell (4) to pour said nutrients or substrate on an area of the cell (4) below the hopper (13).

In an aspect according to any one of the preceding method aspects, the method includes a monitoring step, performed by means of the control unit (50), of one or more of the following parameters:
- a temperature inside the case (2) or compartment of a respective cell (4),
- an amount or percentage of oxygen present in an air composition present in the environment inside the case (2) or compartment of a respective cell (4),
- an amount or percentage of carbon dioxide present in an air composition present in the environment inside the case (2) or compartment of a respective cell (4),
- a gas pressure inside the case (2) or compartment of a respective cell (4),
- a relative humidity value inside the case (2) or compartment of a respective cell (4),
- a pH value of the fluid, such as water, present inside the collection tank (25).

In an aspect according to the preceding aspect the monitoring step includes a substep of comparing a temperature value estimated by the temperature sensor (16) with a threshold temperature value comprised between 25° C. and 35° C. In an aspect according to the preceding aspect the monitoring step, in case said estimated temperature value exceeds the threshold temperature value, comprises at least one of the following steps:
- commanding a movement of one or more cells (4), optionally an oscillation of the cells (4) around the axis of rotation (X),
- emitting an alarm signal to alert a user of a failure condition of the apparatus,
- controlling the activation of the thermoregulation device (20) for blowing gas into the inner volume of the case (2).

In an aspect according to any one of the preceding method aspects the monitoring step comprises a substep of comparing an amount of oxygen estimated by the gas sensor (18) with a reference oxygen value. In an aspect according to the preceding aspect, the reference oxygen value is comprised between 20% and 25% of an air composition in the environment inside the cell (4).

In an aspect according to any one of the preceding method aspects the monitoring step comprises a substep of commanding, based on said comparison, a movement of one or more cells (4). In an aspect according to any one of the preceding method aspects the monitoring step comprises a substep of commanding an oscillation of the cells (4). In an aspect according to any one of the preceding method aspects the monitoring step comprises a substep of emitting, based on said comparison, an alarm signal to notify a user of a failure condition of the apparatus.

In an aspect according to any one of the preceding method aspects the monitoring step comprises the substep of comparing an amount of carbon dioxide estimated by the gas sensor (18) with a reference carbon dioxide value. In an aspect according to the preceding aspect the reference carbon dioxide value is greater than of an air composition present in the environment in the cell (4).

In an aspect according to any one of the preceding two aspects, the monitoring step comprises a substep of commanding, based on said comparison, a movement of one or more cells (4). In an aspect according to any one of the preceding aspects, the monitoring step comprises a substep of commanding an oscillation of the cells (4). In an aspect according to any one of the preceding three aspects, the monitoring step comprises a step of emitting, according to said comparison, an alarm signal to notify a user of a failure condition of the apparatus.

In an aspect according to any one of the preceding method aspects the monitoring step comprises a substep of comparing a gas pressure value estimated by the pressure sensor (18) with a threshold pressure value. In an aspect according to the preceding aspect the threshold pressure value is comprised between 0.8 bar and 1.5 bar, optionally comprised between 1 bar and 1.2 bar. In an aspect according to any one of the preceding two aspects in the event that said estimated gas pressure value exceeds the threshold pressure value, said procedure comprises the step of commanding the delivery or ejection of gas respectively via the air supply line or the air return line.

In an aspect according to any one of the preceding method aspects the monitoring step includes a substep of comparing a relative humidity value estimated by the humidity sensor (17) with a predetermined threshold relative humidity value. In an aspect according to the preceding aspect, the threshold relative humidity value is comprised between 40% and 50%. In an aspect according to any one of the preceding three aspects in the event that said estimated relative humidity value exceeds the threshold relative humidity value, said procedure comprises a step of commanding the delivery or ejection of gas respectively via the air supply line or the air return line.

BRIEF DESCRIPTION OF THE DRAWINGS

Several embodiments and some aspects of the invention will be described below with reference to the accompanying figures provided for illustrative purposes only and therefore not limiting, wherein:

FIGS. 2A and 2B are perspective views of the apparatus according to the present invention;

FIG. 3A is a front view of the apparatus according to the present invention;

FIG. 3C is a detail side view of a cross section of a cell of the apparatus according to the present invention;

FIG. 4 is a schematic view of a cross section of the apparatus according to the present invention;

DEFINITIONS

Figure 1:
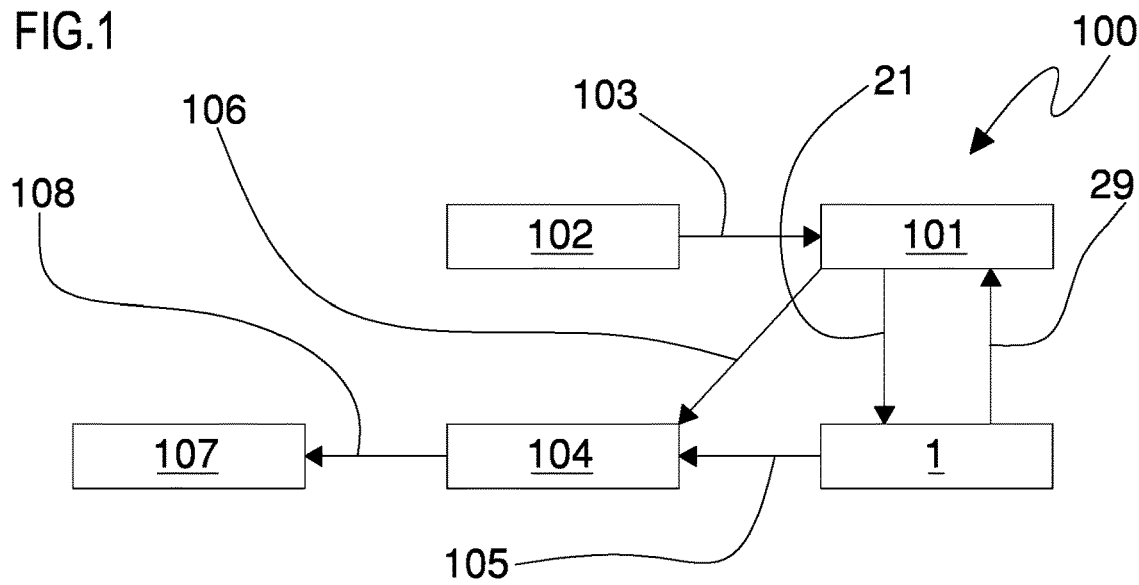
FIG. 1 is a schematic view of a plant including the apparatus according to the present invention.
Figure 2A:
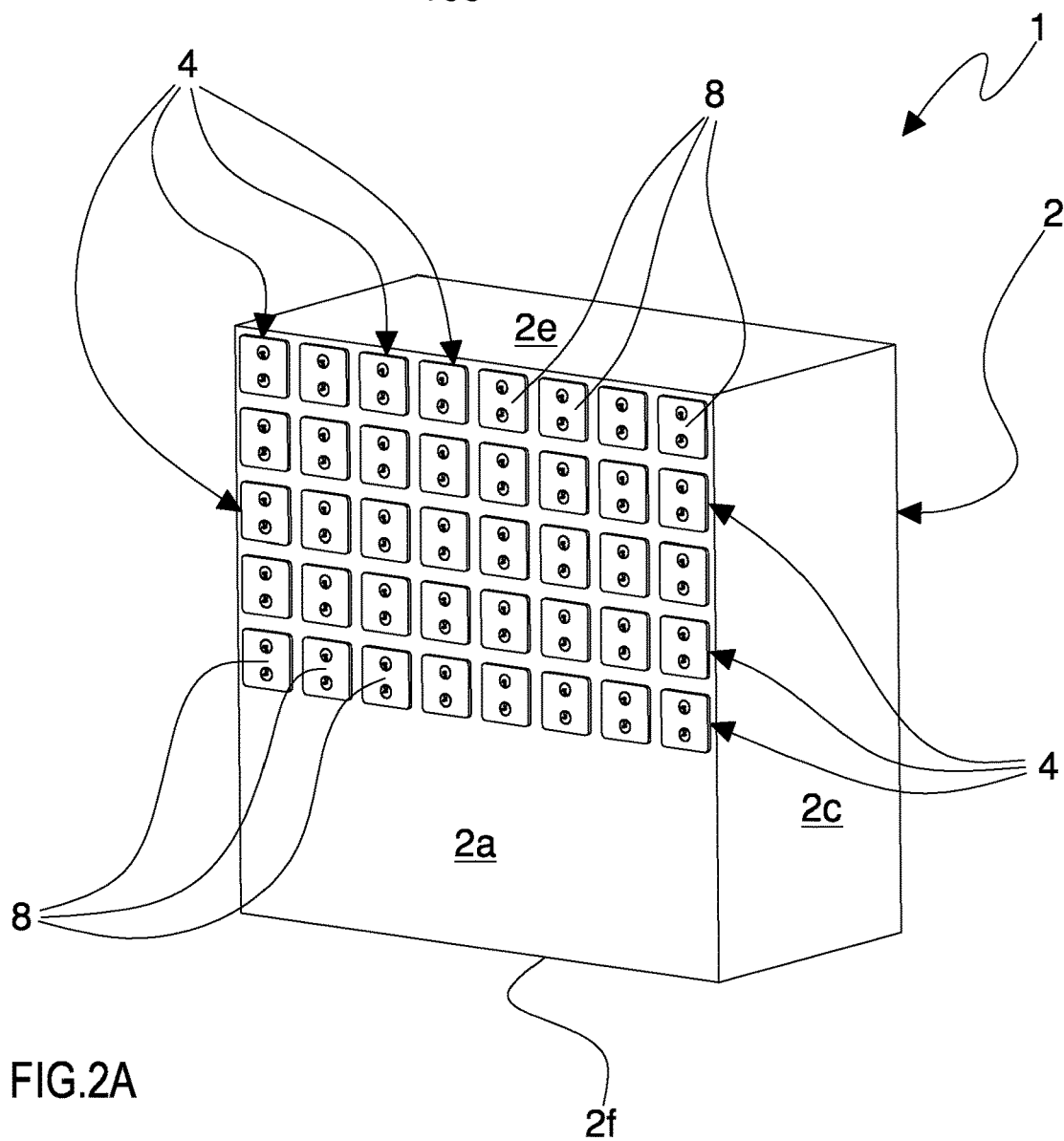

It should be noted that in the present detailed description corresponding parts illustrated in the various figures are shown with the same numerical references. The figures may illustrate the subject matter of the invention by means of representations that are not to scale; therefore, parts and components illustrated in the figures related to the subject matter of the invention may relate only to schematic representations.

The apparatus, plant, and method described and claimed herein may include/use a control unit suitable for controlling operating conditions performed by the apparatus itself, the plant, and/or controlling method steps.

The control unit may be a single unit or a plurality of distinct control units depending on design choices and operational requirements. By control unit is meant an electronic component which may comprise at least one of: a digital processor (CPU), an analog type circuit, or a combination of one or more digital processors with one or more analog type circuits. The control unit can be "configured" or "programmed" to perform certain steps: this can be accomplished in practice by any means that allows the control unit to be configured or programmed. For example, in the case of a control unit comprises one or more CPUs and one or more memories, one or more programs may be stored in appropriate memory chips connected to the CPU(s); the program(s) contain instructions that, when executed by the CPU(s), program or configure the control unit to perform the operations described in relation to the control unit. Alternatively, if the control unit is or includes analog circuitry, then the circuitry of the control unit may be designed to include circuitry configured, in use, to process electrical signals in such a way as to perform the steps related to the control unit.

Parts of the method described herein can be implemented by means of a data processing unit, or control unit, technically replaceable with one or more electronic processors designed to execute a portion of a software or firmware loaded onto a memory medium. Such software may be written in any known programming language. The electronic processors, if two or more in number, may be interconnected by means of a data connection such that their computational powers is shared; the same electronic processors may thus be installed in even geographically different locations, realizing through the aforementioned data connection a distributed computing environment.

The data processing unit, or control unit, may be a general purpose processor configured to perform one or more parts of the method identified in the present disclosure through the software or firmware, or may be an ASIC or dedicated processor or FPGA specifically programmed to perform at least part of the operations of the method described herein. The memory medium may be non-transitory and may be internal or external to the processor, or control unit, or data processing unit, and may be a memory geographically located remote from the electronic processor. The memory medium may likewise be physically divided into multiple portions, or in cloud form, and the software program or firmware may physically provide for portions stored on geographically divided portions of memory.

The term "actuator" refers to any device suitable for providing a movement on a body, such as upon command from the control unit (receipt by the actuator of a command sent by the control unit). The actuator may be electrical, pneumatic, mechanical (e.g., spring), or other types.

The term "substrate" means an inert material conglomerate comprising one or more bodies made of the following materials: wood, tree bark, plastic (e.g., polypropylene), expanded clay, coconut fiber, rock wool, or zeolite.

The term "arthropods" refers to a type of invertebrates with the body covered by a chitinous cuticle, subdivided into metameric segments, each of which is provided with a pair of legs formed by several movable articles. Said arthropods also have a head having with one or two pairs of antennae with a tactile function; they include crustaceans, myriapods, insects, merostomes, arachnids and pantopods.

DETAILED DESCRIPTION

Apparatus for Growing Arthropods

An apparatus for growing arthropods, generally referred to as 1, facilitates the growth of insects in the larval state, e.g., belonging to the families of lepidoptera, beetles, or orthoptera, to an adult stage.

As shown in the accompanying figures, the apparatus 1 comprises a case 2 having a predetermined number of side walls 3 delimiting an inner volume for housing at least one cell 4 for growing arthropods. The case 2 may have a rectangular prismatic shape, although not excluding the possibility of making a case 2 having a different shape, for example, prismatic with a square or trapezium shaped base or of cylindrical conformation. In detail, the case 2 may comprise a front side wall 2a and a rear side wall 2b facing and parallel to each other: the front wall 2a and the rear wall 2b are connected to each other by means of a first and a second side wall 2c, 2d, also facing and parallel to each other. The front wall 2a is spaced and opposed by the rear wall 2b the first and second side walls 2c, 2d are also spaced and opposed to each other. The case 2 further comprises a rear wall 2f having a rectangular profile and from which emerge, from a perimeter edge of the same rear wall 2f, the front wall 2a, the rear wall 2b and the first and second side walls 2c, 2d. The case 2 also includes a rectangular-shaped top wall 2e, opposite to the rear wall 2f, configured for upperly occluding the inner volume of the case. In other words, the case is essentially a container perimeterally delimited by the predetermined number of side walls, the top wall, and the bottom wall, defining an inner environment that is hermetically sealed off from an external environment following the engagement of one or more cells 4 as subsequently detailed.

The inner volume of case 2 may have a volume greater than 4 $m^3$, optionally greater than 16 $m^3$ depending on the type and quantity of cells housed in the case.

Figure 3B:
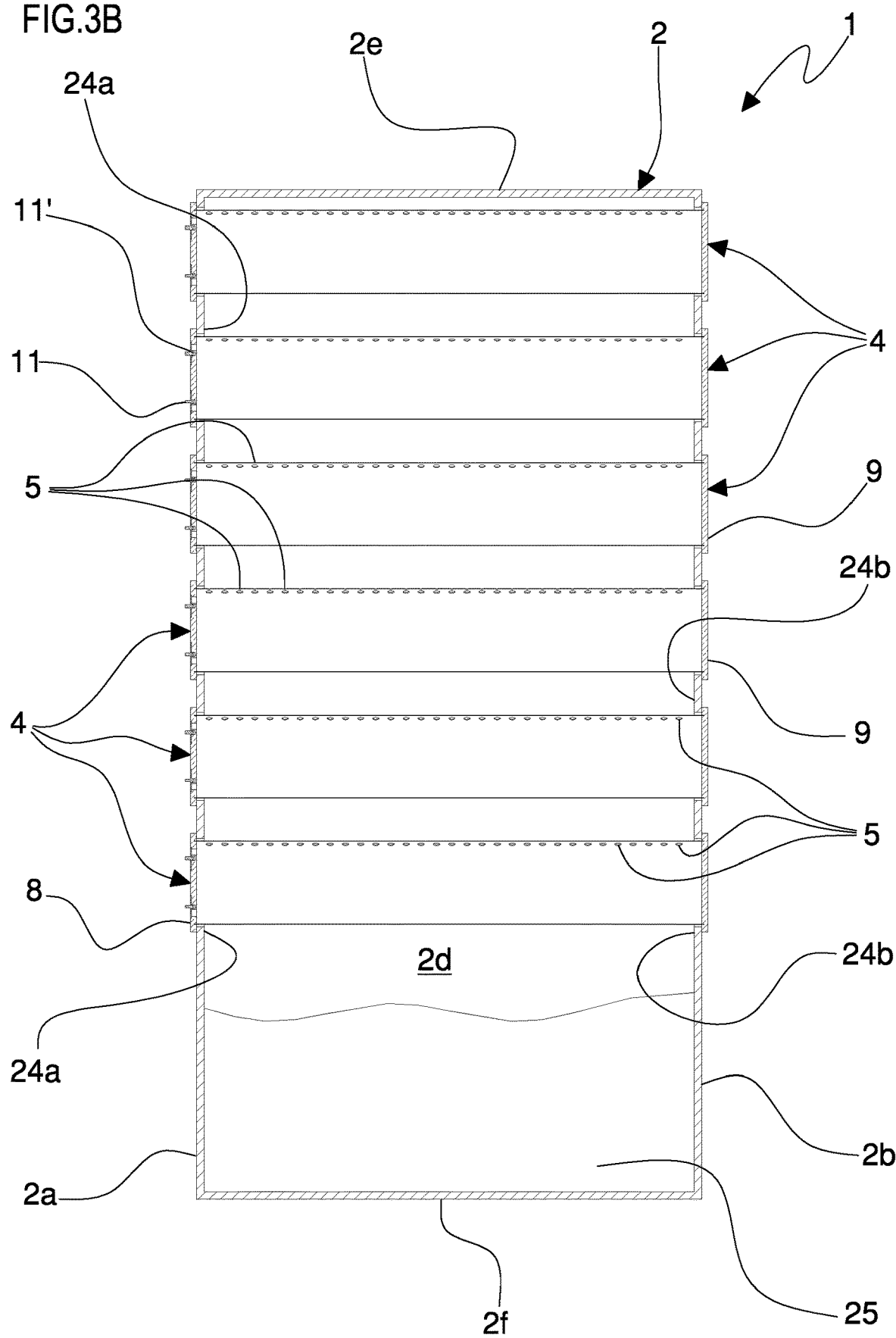
FIG. 3B is a side view of a cross section along the A-A track of the apparatus according to the present invention.

As, for example, shown in FIGS. 3B and 3C, the front wall 2a of the case 2 has a plurality of accesses 24a, each configured for allowing the insertion of a respective cell 4 into the inner volume of the case 2. The accesses 24a are openings defined on the front wall 2a having a square or rectangular conformation; however, it is not excluded the realization of accesses 24a having a different conformation, such as circular. Dimensionally, each access 24a has a surface footprint comprised between 0.1 $m^2$ and 1.3 $m^2$, optionally comprised between 0.9 $mm^2$ and 1 $mm^2$. It should be noted the accesses 24a are made on the front wall 2a at an upper zone of the case spaced from the rear wall 2f of the case and overlying a lower zone of the case 2 close to the rear wall 2f. The accesses 24a are distinct, spaced apart and evenly distributed throughout the upper zone of the case, in number comprised between 20 and 100, optionally comprised between 50 and 80.

Each access 24a of the case, following insertion of a cell, is occluded by a front plate 8 carried by the cell 4 that can be engaged to the front wall 2a of the case 2 to completely separate the inner volume of the case from the external environment. In the accompanying figures, the front plate is, in a non-limiting way, engaged externally to the case 2; however, it is also not excluded the possible to engage the front plate internally to case 2, for example supported by a shelf carried by the rear wall.

The rear wall 2b of the case 2 also has a plurality of accesses 24b configured for allowing engagement of the case with a respective cell 4, made opposite to the accesses 24a of the front wall 2a and aligned with a respective access 24a of the front wall 2a according to a direction orthogonal to the front wall 2a and rear wall 2b. The accesses 24b of the rear wall 2b are structurally identical to the accesses 24a of the front wall 2a and configured, in cooperation with the latter, for allowing insertion and removal of the cell from the case 2. Each access 24b of the rear wall 2b, following the insertion of a cell inside the case 2, is occluded by a back plate 9 carried by the cell 4, which may be engaged to the rear wall 2b of the case to prevent communication between the volume inside the case and an external environment.

As, for example, shown in FIG. 3B and FIG. 4, the case 2 includes a collection tank 25 inferiorly delimited by the rear wall 2f and perimeterally delimited by respective portions of the front wall 2a, rear wall 2b, and side walls 2c, 2d near the rear wall 2f. The collection tank 25 is placed at the lower area of the case below each cell and it is configured for containing at least one fluid, e.g., water, having a volume greater than 1 $m^3$, optionally comprised between 7 $m^3$ and 12 $m^3$. The collection tank 25 is configured to allow solubilization of gas in a fluid, e.g., carbon dioxide, present in the environment inside case 2.

Figure 6:
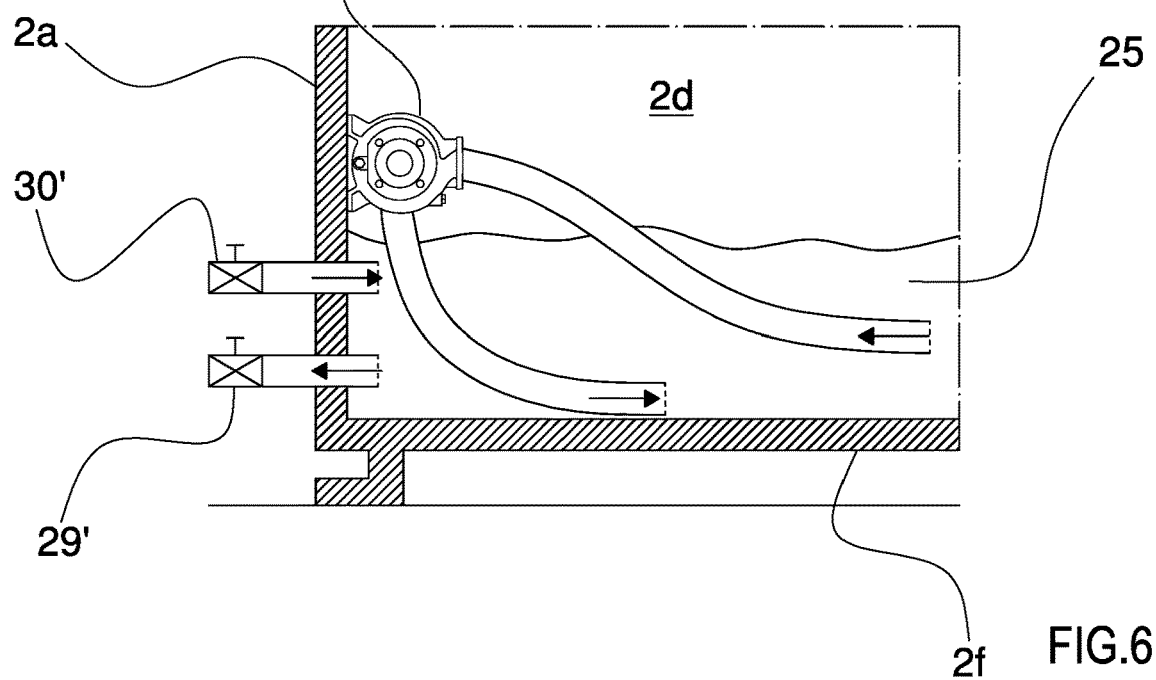
FIG. 6 is a detailed view of a collection tank of the apparatus according to the present invention.

The apparatus may also include a mixing device 26 active in the collection tank 25 and configured to move the fluid contained in the same collection tank 25. As an example shown in FIG. 6, the mixing device 26 may include a pump to which a recirculation circuit placed in fluid communication with the collection tank is connected. The pump is configured to move fluid contained within the collection tank 25 through the recirculation circuit, allowing proper mixing and solubilization of carbon dioxide within the fluid in the collection tank 25. The apparatus may also include a control unit 50 operatively connected to the mixing device 26 and configured to control its operation. Specifically, the control unit 50 is configured to control an active condition of the mixing device 26 wherein it moves the fluid within the collection tank 25, and an inactive condition wherein the same mixing device 26 does not operate on the fluid within the collection tank 25, preventing its movement. The apparatus also includes a fluid delivery manifold 30' and a fluid return manifold 29' both defined on and in fluid communication with the collection tank 25, which are respectively configured to allow fluid to be introduced into and withdrawn from the collection tank 25. The mixing device 26, in the activation condition, can also be configured to move fluid in and out of the collection tank 25 via the fluid delivery and return manifolds 30', 29'. The transition between the activation and deactivation condition of the mixing device is subject to the determination of a pH value of the fluid within the same collection tank 25, according to the following description.

The apparatus may also include a pH sensor 27 active on the collection tank and configured to generate a representative pH signal of the fluid present within the same collection tank 25. The control unit 50 is operatively connected to the pH sensor 27, configured to receive the signal emitted by the latter and estimate, based on said signal, a pH value of the fluid present in the collection tank 25. The control unit 50, following the determination of a pH value of the fluid in the collection tank 25, is configured to compare said value with a reference value representative of a threshold pH value. The detection of the pH value allows for determining the acidity of the water, and indirectly, the amount of carbon dioxide solubilized in water. The control unit 50 is then configured to command the ejection of fluid from collection tank 25 once a saturation value coincident with the threshold reference value is reached, beyond which solubilization of carbon dioxide in water would no longer be possible. In fact, carbon dioxide $CO_2$ dissolving in water creates carbonic acid ($H_2CO_3$), which results in a change in the acidity of the water in collection tank 25 ($H_2O+CO_2<=>H_2CO_3$). In other words, the pH sensor is configured to detect the dissolution of a carbon solute in a water solvent.

In the event that the control unit detects that the estimated pH value exceeds the above-mentioned threshold reference value corresponding to a maximum acidity value achievable by the water in the collection tank 25, the control unit 50 is configured to command the activation of the pump of the mixing device 26 for allowing the movement of water saturated with carbon dioxide, externally to collection tank 25 (through the fluid return manifold 29') and control the introduction (through the fluid delivery manifold 30') of water having a neutral pH value between 4 and 9.

The apparatus may also include a thermoregulation device 20, such as a heat exchanger, configured to deliver gas into the inner volume of the case 2. As will be better described below, the thermoregulation device 20 allows for maintaining a constant temperature in the inner volume of the case by delivering gas at either low temperature (below 20 C°) or high temperature (above 30° C.).

The apparatus may also include a gas delivery manifold 21 connected to the case 2 and configured to allow the introduction of gas, e.g., oxygen, from an external environment or from an oxygenator 101 detailed in the following. The apparatus may also include a gas return manifold 22 connected to the case 2 and configured to allow gas to be ejected in atmosphere from the inner volume of the case 2.

The apparatus may further include one or more light sources 40 active within the case, each configured to irradiate each cell of the apparatus and contribute, in cooperation with one or more of the sensors subsequently detailed, to set optimal insect growth conditions. The light sources 40 may, for example, include LED lights to prevent undesired localized heating which could cause fire and/or incubation of pathogens within the cells, such as viruses, bacteria and fungi. The apparatus may also include a plurality of sensors of different types, suitable for measuring different parameters related to the environment in the inner volume of the case 2 for reaching the optimal environmental conditions for growing insect or larval.

The apparatus may also include at least one temperature sensor 16 placed in the inner volume of the case and configured to generate a signal representative of a temperature inside the case 2. The control unit 50 is connected to the temperature sensor 16, configured to receive the signal emitted by the temperature sensor 16 and estimate, based on the same signal, a temperature value in the inner volume of the respective cell 4. The control unit 50 is then configured to compare the estimated temperature value with a threshold value comprised between 25° C. and 35° C., and if the estimated value exceeds the threshold value, the control unit 50 may be configured for commanding the movement of one or more cells 4 around a respective axis of rotation X, for allowing the inlet of an airflow into the compartment of the cell and thus reducing the temperature inside the cell. In addition to or as an alternative to the step of commanding the movement of cell 4, the control unit 50 may be configured to emit an alarm signal to alert an operator to a malfunctioning condition of the apparatus.

The control unit 50 is also connected to thermoregulation device 20 and if the estimated temperature value is different from the threshold value, it can be configured to control the delivery of cold air (optionally at a temperature below 20° C.) or hot air (optionally at a temperature above 30° C.) into the inner volume of case 2, consequently allowing to maintain the temperature in compartment of the cell 4 around 30° C.

The apparatus may have a plurality of temperature sensors 16, each active in the compartment of each cell 4 or in the compartment of a subgroup of cells 4 and configured to generate a signal representative of a temperature in the compartment of the cell. The control unit 50 is connected to each temperature sensor 16 to receive said signal representative of the temperature inside the compartment of the cell and, similarly to the above description, is configured to control the rotation of the cell, generate an alarm signal, and/or control the activation of the thermoregulation device.

The apparatus may also include a gas sensor 18 placed in the inner volume of the case and configured to generate a signal representative of at least one of the following parameters:
  an amount of oxygen,
  a percentage of oxygen relative to an air composition in the compartment of the cell 4,
  an amount of carbon dioxide,
  a percentage of carbon dioxide relative to a composition of air in the compartment of the cell 4.

The control unit 50 is connected to gas sensor 18 and is configured to receive the signal emitted by the latter and subsequently estimate a gas value in the inner volume of case 2. The control unit 50 is also configured to command the movement of one or more cells 4 with respect to case 2 if:
  the measured gas values detected by gas sensor 18 are representative of an amount of oxygen lower than a threshold control parameter, the latter being 20% of an air composition present in the inner volume of case 2, or
  the measured gas values detected by gas sensor 18 are representative of an amount of carbon dioxide in the environment inside cell 4 that is lower than a threshold control parameter, the latter being 0.05% of an air composition present in the inner volume of case 2.

Alternatively, or in addition to the step of commanding the movement of the cells 4, the control unit 50, if detects an amount of oxygen greater than the threshold control parameter (equal to 20% of an air composition present in the inner volume of the case 2), may be configured to command the opening of the gas delivery manifold 21 and allow a predetermined amount of oxygen to be introduced into the inner volume of the case, re-establishing an optimal oxygen value. Dually, the control unit 50, if detects an amount of carbon dioxide that is percentually higher than the threshold control parameter (equal to 0.05% of an air composition present in the inner volume of case 2), is configured to command the opening of gas return manifold 22 for allowing a predetermined amount of gas or air to be ejected and reestablishing the presence of an amount of carbon dioxide in a normal range.

Alternatively to having a gas sensor 18 operating in the inner volume of the case 2, the apparatus may have a plurality of gas sensors 18 active in a respective compartment of a cell 4 or in the compartment of a subgroup of cells 4, configured to generate a signal representative of a gas quantity in the compartment of a respective cell. In order to maintain a percentage value of oxygen and carbon dioxide that does not exceed the respective threshold control parameters, the control unit 50 is connected to each gas sensor 18 and, depending on a value of a gas quantity in the compartment of the case, is configured to command the rotation of the cell to allow the introduction of air from the gas delivery manifold 21 and/or command the expulsion of gas from the gas return manifold 22.

The apparatus also includes a gas pressure sensor 31 placed in the inner volume of the case 2 and configured to generate a signal representative of a pressure inside the case 2. The control unit 50 is operatively connected to the pressure sensor 31, configured to receive the signal emitted by the latter and estimate a pressure value in the inner volume of the case 2. The control unit 50 is configured to command the introduction or ejection of gas, respectively via gas the delivery manifold 21 or the gas return manifold 22, if it detects a pressure value below or above a threshold pressure value comprised between 0.8 bar and 1.5 bar, optionally comprised between 1 bar and 1.2 bar.

Alternatively, the apparatus may have a plurality of gas pressure sensors 31 active in the compartment of a respective cell 4 or in the compartment of a subgroup of cells 4, which operate in a manner entirely analogous to that described above in connection with the gas pressure sensor 31 active in the inner volume of case 2.

The apparatus may further include a humidity sensor 17 placed in the inner volume of case 2 and configured to generate a signal representative of relative humidity in the inner volume of the case. The control unit 50 is operationally connected to the humidity sensor 17, is configured to receive the signal emitted by the latter and estimate a relative humidity value. The control unit 50 is configured to command the introduction or ejection of gas, respectively via the gas delivery manifold 21 or the gas return manifold 22, if said measured pressure values detected by the pressure sensor 18 exceed a predetermined relative humidity value, the latter being comprised between 40% and 50%.

As previously mentioned, the case 2 is configured to allow house and support a plurality of cells 4 for growing arthropods, above the collection tank 25. The cells are equal in number to the accesses 24a and 24b respectively made on the front wall 2a and the rear wall 2b of the case 2. Optionally, a number of cells comprised between 10 and 200, more optionally comprised between 30 and 140, may be housed within the case. The cells in the apparatus may all have the same structure and functionality if the apparatus is used to perform the growth of the same species of arthropods. In such a case, the optimal environmental conditions for realizing the breeding of the same species of arthropods are the same, and the need to have cells that are structurally or functionally different from each other does not arise. However, the presence of cells having different structures and functionalities for allowing the user to realize the simultaneous breeding of different arthropod species within respective cells 4.

As shown in the accompanying figures, the cell 4 has a hollow body defining a compartment configured to contain a predetermined amount of a substrate, e.g. of the type precedingly described, for arthropod support. From a structural point of view and as for example visible in FIGS. 3B and 3C, the hollow body of the cell 4 may have an elongated tubular conformation extending along a development direction orthogonal to the front wall 2a and the rear wall 2b of the case, between a first and a second longitudinal end at which it is engaged to the case 2. Optionally, the hollow body has a cylindrical conformation that, in contrast to the use of cells with hollow bodies of prismatic conformation, prevents the settling of substrate or organic waste materials produced by insects, in corner areas from which they are difficult to remove. Note how the hollow body of cell 4 is removably engageable to the case 2, effectively allowing a user, to easily extract the same hollow body from the case, for example to perform maintenance or cleaning operations on the latter.

The hollow body has passage openings respectively defined at the first and second longitudinal ends, configured to allow communication between the compartment of the hollow body and an environment outside the cell. The hollow body has a constant cross-sectional area along the development direction, having diameter comprised between 100 mm and 500 mm and a length, measured along the development direction, comprised between 1 m and 6 m, optionally comprised between 1.2 m and 3 m.

The cell 4 may also include a plurality of through holes 5 made on the hollow body and configured to place the inner volume of case 2 in communication with the compartment of cell 4. The holes are uniformly distributed along a direction substantially parallel to the development direction of cell 4. Dimensionally, each hole 5 defines a through-opening greater than 19 mm$^2$, optionally ranging from 50 mm$^2$ to 180 mm$^2$. Depending on the size and passage opening, the holes 5 are organized into at least two sets of holes parallel to each other and parallel to the direction of cell development, each comprising the same number of holes. In particular, the holes 5 are organized into five sets of holes parallel to each other, configured to allow a gas exchange between the compartment of the cell and the inner volume of the case 2, greater than 0.01 m$^3$/s. Note also, as for example shown in FIG. 3B, how the holes 5 are defined at a top portion of the hollow body facing the top wall 2e of the case 2.

Figure 7:
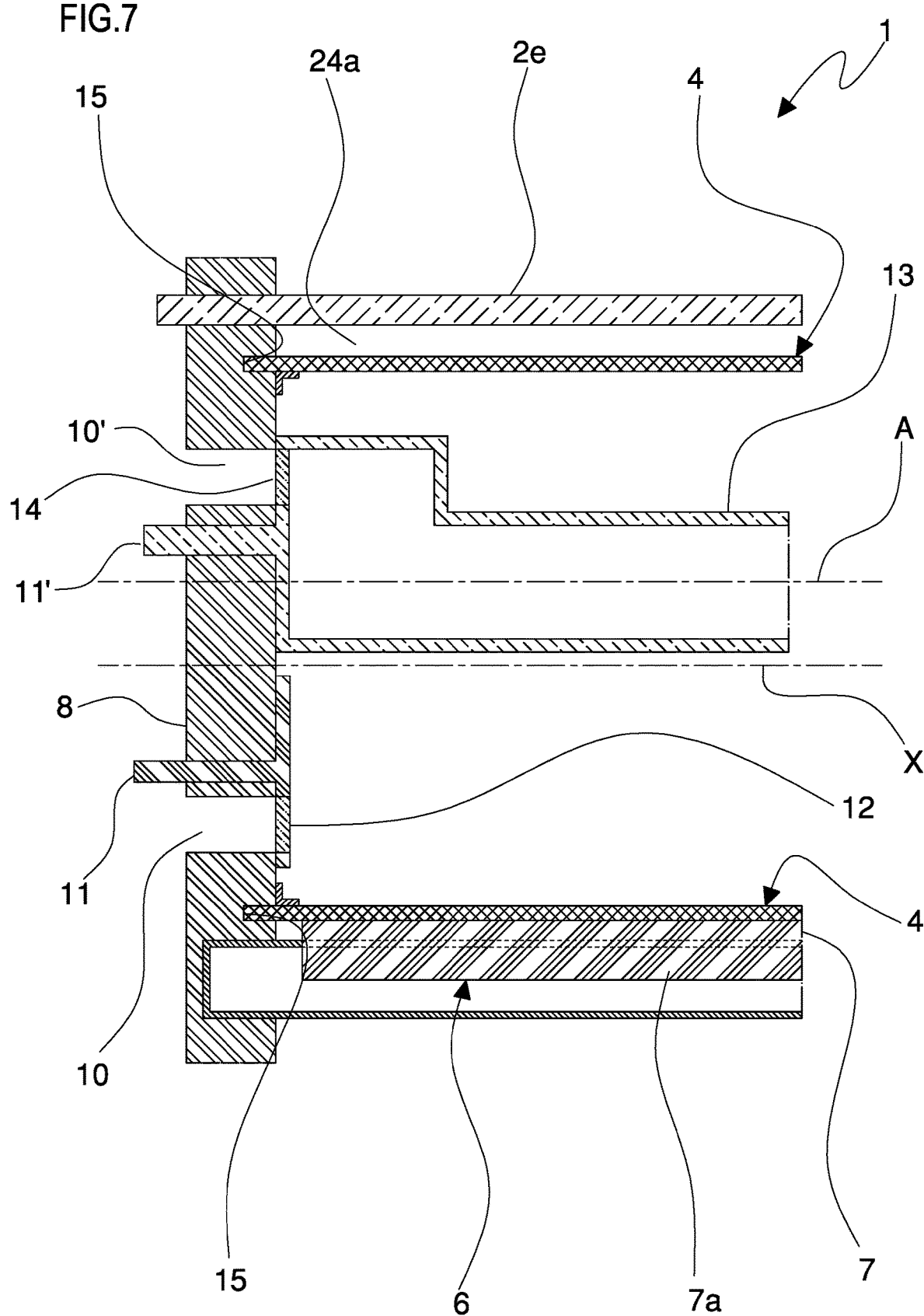
FIG. 7 is a detailed side view of a cross section of a cell of the apparatus according to the present invention.

As previously mentioned, the cell comprises the front plate 8 and the back plate 9 respectively engaged at the first and second longitudinal ends of the hollow body in occlusion of the passage openings of the same hollow body. The front plate 8 and the back plate 9 have a respective blind groove 15 suitable for receiving in engagement the hollow body of the cell 4, at which there may be a gasket to prevent leakage of material or liquids that may be present within the same hollow body. The front plate 8 and the back plate 9 are removably engaged to the case 2, e.g., by screws, respectively in occlusion of the accesses 24a of the front wall 2a and the accesses 24b of the rear wall 2b of the case. The front plate 8 and the back plate 9 may also have an additional gasket interposed between the same plate and the case to completely isolate the inner volume of the case from the external environment. The cell may have a through opening 10 defined on the front plate 8 configured to allow communication between the compartment of the hollow body and the external environment (FIG. 7). Dimensionally, the through opening 10 of front plate 8 has a through section greater than 300 mm$^2$, optionally comprised between 500 mm$^2$ and 2000 mm$^2$.

The cell 4 may also have a selector 11 carried by the front plate 8 and placed near the through opening 10, which is configured to selectively overlap with the through opening 10 of the front plate to allow or prevent communication between the compartment of the hollow body and the external environment.

Optionally, in an embodiment not shown in the accompanying figures, the selector 11 may have a semicircular conformation and be movable by rotation with respect to the hollow body between a first and second operating position. In the first operating position, the selector is superimposed to the through opening 10 of the front plate 8 to obstruct its passage, while in the second operating position, the selector 11 is offset from the through opening 10, allowing the compartment to communicate with the external environment.

In the embodiment shown in the accompanying figures, the selector 11 is a plate having circular conformation, engaged to the front plate 8 at a central area of the same plate and movable by rotation about an axis passing through the center of the plate and parallel to the direction of development of the cell 4. Note that the selector 11 includes in turn a through opening 12 configured to allow communication between the compartment of the hollow body and an environment outside the case 2 when superimposed on the through opening 10 of front plate 8. The through opening 12 of the selector 11, when misaligned from the through opening 10 of the front plate 8 is configured to prevent access into the compartment of the cell. The through opening 12 of the selector 11 may be a hole made at a perimeter zone of the plate spaced from the center zone, which has dimensions, and in particular a diameter, at least equal to a diameter of the through opening 10 of the front plate 8. Optionally, the through opening 12 of the selector 11 is dimensionally identical to the through opening 10 of the front plate 8, which has a through section greater than 300 mm$^2$, optionally comprised between 500 mm$^2$ and 2000 mm$^2$.

As will be detailed later, the through openings 10, 12—respectively of the front plate 8 and the selector 11—in the first operating position of the selector 11 are configured to allow the extraction of the substrate from the hollow body of the cell 4. Indeed, if it is detected that the arthropods (e.g., insects) in the hollow body have reached a predetermined size, e.g., adult size, the selector 11 is moved from the second to the first operating position, allowing from outside the case 2, to access the compartment of the hollow body of the cell for extracting substrate from the same cell 4.

The cell 4 also has an auxiliary through opening 10' defined on front plate 8 and configured to allow communication between the compartment of the hollow body and the external environment. Dimensionally, the auxiliary through opening 10' is identical to the aforementioned through opening 10 on the front plate 8 and is distinct and spaced apart, optionally angularly offset, from the latter by an angle substantially comprised between 160° and 200°. As, for example, shown in FIG. 5, the through opening 10 of the front plate 8 and the auxiliary through opening 10' are respectively placed inferiorly and superiorly with respect to an ideal centerline plane parallel to the rear wall 2f of the case that longitudinally sections the hollow body of the case. The cell 4 also has an auxiliary selector 11' carried by the front plate 8 and arranged near the auxiliary through opening 10', configured to selectively allow access to the compartment of the hollow body via the same auxiliary through opening 10'. The auxiliary selector 11' is movable by rotation about an axis parallel to the development direction of the cell 4 and configured to selectively occlude the auxiliary through opening 10'. Note that the auxiliary selector 11' is movable with respect to front plate 8 independently of the selector 11: the auxiliary selector 11' and the selector 11 are thus structurally and functionally independent of each other, allowing both simultaneously and alternatively, access to the compartment of the hollow body of the cell 4.

The auxiliary selector 11' has an auxiliary through opening 12' that allows communication between the compartment of the hollow body and an environment outside the case 2 when superimposed on the auxiliary through opening 10' of the front plate 8. The auxiliary through opening 12' is thus configured to prevent access into the compartment of the cell when misaligned with respect to the auxiliary through opening of the front plate 8. The auxiliary through opening 12' of the auxiliary selector 11' may be a hole made at a perimeter area of the auxiliary selector 11', having dimensions, and in particular a diameter at least equal to a diameter of the auxiliary through opening 10' of the front plate 8. In particular, the auxiliary through opening 12' of the auxiliary selector 11' is dimensionally identical to the auxiliary through opening 10' of the front plate 8, which has a cross section greater than 300 mm$^2$, optionally comprised between 500 mm$^2$ and 2000 mm$^2$.

As will be detailed later, auxiliary through opening 10' and auxiliary through opening 12' of auxiliary selector 11', are configured, when overlapped with each other, to allow substrate or nutrient to be inserted into the compartment of the hollow body of cell 4.

Note the hollow body of the cell 4, in an engagement condition with the case 2, is also rotationally movable with respect to the same case 2, the front plate 8 and the back plate 9, for mixing the substrate. The hollow body is movable by rotation about an axis of rotation X passing through the center of the cell 4, thus resulting, under use conditions of the apparatus, orthogonal to the front wall 2a and the rear wall 2b of the case 2. In detail, the hollow case is movable between a first and a second limit position angularly offset from each other by an angle comprised between 60° and 140°, wherein said angular offset corresponds to an internal angle subtended between two straight lines respectively passing through the axis of rotation X of the cell 4 and a point of the same cell 4 respectively in the first and second limit positions.

The hollow body performs an oscillatory motion about the axis of rotation X between the first and second limit positions at a frequency comprised between 0.01 Hz and 0.5 Hz, for mixing the substrate. The rotary and, in particular, oscillatory movement of the hollow body of the cell is advantageous if there is the need to separate organic residues, e.g., feces produced by insects, from the inert material characterizing the substrate. This allows for growing arthropods on a clean substrate, namely a substrate devoid of organic waste at a surface (top) portion. In other words, the clean substrate is defined by the mixed substrate that has any organic wastes accumulated only at a bottom portion of the compartment.

Figure 5:
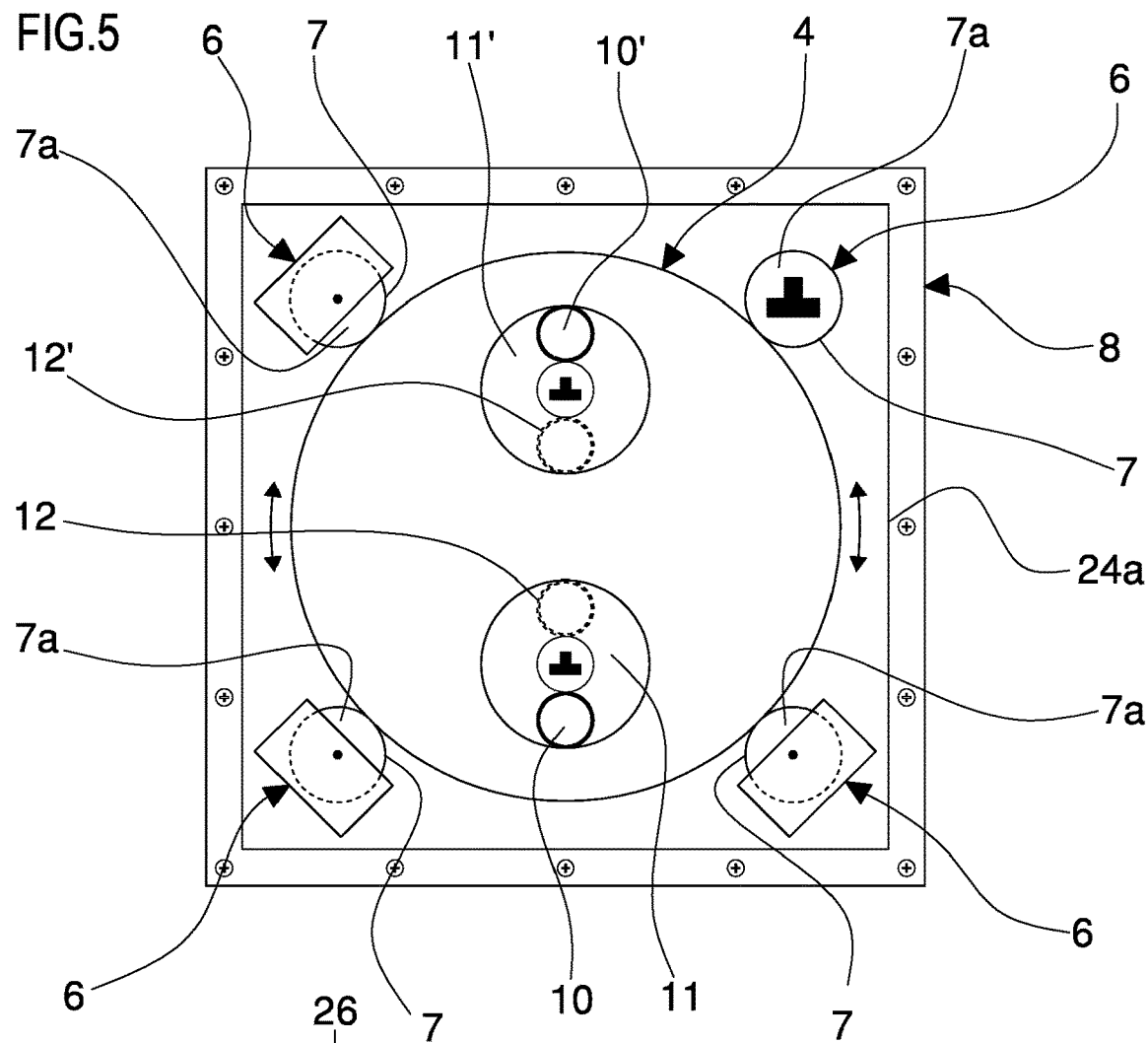
FIG. 5 is a detailed front view of the cell of the apparatus according to the present invention.

For example, as shown in FIGS. 5 and 7, the apparatus may comprise a plurality of movement assemblies 6, each of which has at least one rotating element 7 engaged to the case 2 in the inner volume and placed in contact with an outer surface of the hollow body for rotating it. Each movement assembly 6 is associated with a respective cell and may have a plurality of rotating elements 7 engaged to the case, configured to contact different portions of the outer surface of the hollow body. In particular, each movement assembly 6 comprises at least 2 rotating elements 7 active on the same cell 4. To better understand the relative position between each rotating element 7 and the hollow body of a cell, consider the same hollow body of cylindrical conformation inscribed in an ideal prism having a triangular, square or rectangular base, in which the rotating elements 7 are positioned at a respective vertex of the ideal prism extending along the development direction of the hollow body. FIG. 5 shows, for example, a hollow body inscribed in an ideal prism with a square base and a movement assembly 6 having four rotating elements 7 positioned at a respective vertex of the ideal prism with a square base.

In one embodiment, at least one rotating element 7 of each movement assembly 6 is motorized and configured to transmit a rotary motion to the respective cell 4. In fact, the movement assembly may include an actuator, such as an electric motor, active on the motorized rotating element 7 for rotating it. Each cell 4, associated with a respective movement assembly 6, may be movable independently to the remaining cells. This feature may be advantageous if different environmental conditions occur within the cells, for example caused by an overpopulation of arthropods, thus making it possible to agitate selected cells so as to reestablish optimal environmental conditions for growing insects.

In a further embodiment, the movement assemblies 6 arranged within the case are kinematically connected to each other. In such configuration, only one subgroup of the movement assembly has rotating elements 7 motorized and their associated actuators or electric motors, consequently allowing for synchronous movement of each cell present within the case 2. However, in a further embodiment, a hybrid configuration between the two described above is also possible, in which a first subgroup of movement assemblies is independently motorized, while a second subgroup is kinematically connected to each other and synchronously move about respective axes X.

The control unit 50 may be active in command on each actuator or electric motor active on a motorized rotating element and configured to command, at predetermined time intervals or following the receipt of a command, the execution of a movement cycle of the cell 4 where the actuator operates. Each movement cycle has a duration comprised between 7 s and 30 s and is executed at regular intervals, in particular the time between one movement cycle and a subsequent movement cycle is comprised between 18 h and 30 h, varying depending on the type of arthropods and the environmental conditions inside the cell.

From a structural point of view, each rotating element 7 may have a roller 7a extending along a respective axis Y parallel to an axis of rotation X of rotation of the cell 4. Each roller 7a may have a cylindrical conformation with a diameter comprised between 40 mm and 50 mm, and a length equal to the length of the hollow body of cell 4 to which said roller 7a is directly in contact.

The apparatus may have a plurality of hoppers 13, each of which is engaged within the compartment of the hollow body of a respective cell 4 and configured to receive a predetermined amount of substrate and/or nutrients and discharge them into the hollow body. For example, as shown in FIG. 7, each hopper 13 is arranged at the auxiliary through opening 10' of the front plate 8, which is configured to receive substrate and nutrients entering the hollow body 2 through the auxiliary through opening 10' of the front plate 8 and the auxiliary through opening 12' of the auxiliary selector 11'. From a structural point of view, the hopper has an elongated hollow body extending lengthwise along a direction A parallel to the extension direction of the hollow body of the cell, on which a longitudinal passage 14 facing the auxiliary through opening 10' of the front plate 8 is defined. The elongated body of the hopper 13 has, in cross-section according to a plane orthogonal to the extension direction of the hopper 13 itself, a substantially "C", "V" or "U" shape. In other words, the hollow body of the hopper 13 is not a cylindrical tubular body having a continuous side wall, but rather has an upper opening 13a extending along the direction A.

The hopper 13 is further movable by rotation with respect to the hollow body of the cell 4, about an axis Z substantially parallel to the axis of rotation X of rotation of the hollow body, between a loading position and an unloading position. In particular, in the loading position, the hopper 13 has concavity facing a top portion of the hollow body or, in other words, the top opening 13a of the hopper is facing the top wall 2e of the case 2, whereas, in the unloading position, the top opening 13a of the hopper is facing the bottom wall 2f of the case 2, configured to pour substrate and/or nutrients into the compartment of the hollow body.

The apparatus may also include at least one camera 23 operating in the compartment of each cell 4 to monitor the state of arthropod growth and generate a video signal representative of a scene inside the compartment. The control unit 50 is operatively connected to the camera 23 and configured to perform a control procedure comprising the steps of:
  receiving the video signal from the camera 23,
    determining at least one image representative of the scene inside the compartment,
    detecting, within said image, the presence of at least one arthropod,
    determining at least one value of a growth parameter of said arthropod,
    comparing said value of growth parameter with at least one benchmark parameter,
    according to said comparison, emitting a command signal for the extraction of said arthropods from the cell 4.

In other words, the control procedure allows, by means of the camera 23, to monitor the growth status of arthropods so that they can be ejected if they reach a predetermined growth stage or adult stage. Depending on the type of arthropod breed in the cell, the growth parameter may include at least one of a length or average length of the arthropod, a ratio between a footprint or volume of one or more arthropods and a footprint or volume of the substrate. If, for example, insects are breed in a cell and the growth parameter is the average length of insects in the compartment of the hollow body, the control unit 50 is configured to select as a benchmark a predetermined average length value of insects that have already reached an adult stage. Alternatively, if insects are being breed in the cell and a ratio between the footprint or volume of one or more insects and a footprint or volume of the substrate is selected as the growth parameter, the control unit is configured to compare the value given by the ratio of the aforementioned footprints or volumes and a predetermined reference value calculated taking into account the size of insects at an adult stage.

The control procedure, if the estimated arthropod growth values are equal to or greater than the benchmark, also includes a step of ejecting the substrate from a respective cell 4 according to the procedures detailed below.

The camera 23 can be a thermal camera configured to generate a representative signal of the temperature inside the cell to be sent to the control unit 50. The control unit 50, following the receipt of the temperature signal, is configured to determine a value of the temperature inside the cell and compare it with the predetermined threshold value. If the measured temperature value exceeds a threshold value comprised between 25° C. and 35° C., the control unit 50 is configured to command the movement of the cell (e.g., applying an oscillatory motion) for regulating the temperature in the compartment of the cell.

Plant for Growing Arthropods

It is also an object of the present invention to provide a plant for arthropod (e.g., insect or insect larvae) growth, using the apparatus according to the above description and/or according to the accompanying claims.

The plant may have one or more industrial robots, such as anthropomorphic robots, suitable for interacting with the previously described apparatus, for example, to accomplish the extraction of substrate or arthropods at an adult stage or to accomplish the introduction of substrate or nutrients into a respective compartment of the cells 4. In detail, each robot is configured for communicating with the control unit 50 and consequently acting on one or more cells of the apparatus when requested by the control unit 50. Each robot may have a dedicated control unit that can receive signals emitted by the control unit 50 of the apparatus and acting accordingly. For example, the control unit of the robot may be configured to receive a command to introduce substrate or nutrients inside the cell and consequently command the robot to move at one or more cells in which nutrients or substrate is to be introduced. The robot can then be configured to engage the auxiliary selector 11' and move it by rotation with respect to the front plate of the cell to align the auxiliary through opening 10' and the auxiliary through opening 12' of the auxiliary selector 11'. Following the rotation of the selector 11, the robot can be configured to insert a cannula into the compartment of the cell, through which nutrients and substrate are introduced in the hopper 13. The control unit of the robot may also be configured to receive an extraction command of arthropods at the adult and of substrate. In such configuration, the control unit of the robot is configured to move the robot at the cell requiring ejection of substrate and arthropods. The robot is then configured to engage the selector 11 and move it by rotation with respect to the front plate of the cell to align through opening 10 of the front plate and through opening 12 of selector 11. Following this operation, the robot can be configured to insert a cannula into the compartment of the cell, through which substrate and arthropods are extracted from the cell for subsequent processing.

In an embodiment of the invention, the robot can also be configured to engage one or more cells to move them, synchronously or asynchronously, between the first and second limit positions.

As for example shown in FIG. 1, the plant may include at least one oxygenator 101 configured to generate a predetermined amount of gas, e.g., oxygen, to be fed into the case of the apparatus. The plant includes a fluid delivery line 30 that connects the oxygenator with the gas delivery manifold 21 of the case to put the oxygenator in communication with the apparatus and allow a fluid containing oxygen to flow through. The oxygenator 101 may be an oxygen cylinder or an oxygen generator configured to deliver oxygen in the apparatus and allow an optimal oxygen level to be maintained within the case. In such a configuration, the fluid delivery line 30 connects the oxygenator and gas delivery manifold 21. The oxygenator may also include an algae container for housing algae within an aqueous solution. In particular, the algae container can be an algae bioreactor configured to convert into oxygen, carbon dioxide in the atmosphere inside the bioreactor. The algae bioreactor may be a known bioreactor, which includes one or more algae containers configured to generate oxygen. In such configuration, the fluid delivery line 30 connects the oxygenator with the fluid delivery manifold 30' defined on the collection tank 25. Through the fluid delivery line, it is then possible to allow the introduction of water into the collection tank of the apparatus having a pH comprised between 6 and 8. The plant may also include a fluid return line 29 that connects the oxygenator 101 with the collection tank 25 to allow fluids to flow between the collection tank 25 itself and the algae container. In particular, one end of the fluid return line 29 connects the oxygenator with the fluid return manifold 29' of the collection tank 25 to allow the movement of water having an acidic pH, optionally comprised between 1 and 5, to the algae bioreactor. In this way, the algae bioreactor itself is configured to take advantage of the solubilized carbon dioxide within the water taken from the collection tank 25 of the apparatus to produce oxygen.

The plant 100 may also allow the growth of animal species, e.g., insects, and/or plants by exploiting substances or gases obtained from the treatment of sludge or wastewater, civil and/or industrial. In fact, the plant may include a wastewater container 102 to perform a treatment of a dirty solution, e.g., sewage, and allow the extraction of gas from the latter. The wastewater container 102 performs treatment of the solution in a conventional manner, such as by employing the use of one or more air jet nozzles configured to act directly on the matter to be treated to oxidize it and allow the extraction of gases, such as Carbon Dioxide $CO_2$, Carbon Monoxide CO, Nitrogen Oxides NON, Sulfur Oxides SON, Volatile Carbon Complexes VOC. The plant 100 may also include a gas distribution line 103 that connects the wastewater container 102 with the oxygenator 101 to allow the movement of the aforementioned gases extracted from the wastewater into the oxygenator. In such configuration, the algae inside the algae container exploit the gases from the wastewater container to generate oxygen.

The plant may also include a fish breeding tank 104 to promote fish breeding in fish farming. Such a fish breeding tank may be of known type and configured to receive oxygen from an environment outside the tank for breeding fish. The plant may also include a gas inlet line 105 configured to place the collection tank 25 in communication with the fish breeding tank 104 itself. In particular, the gas inlet line 105 may be configured to allow gas, such as carbon dioxide, to flow from the collection tank 25 to the fish breeding tank 104. The plant may also include a fluid inlet line 106 that connects the oxygenator 101 with the same fish breeding tank 104 to allow a flow of fluid containing oxygen to flow through the fish breeding tank 104 itself.

The plant may further include a sprout container 107 to promote the growth of plant sprouts of a known type, as well as an auxiliary fluid inlet line 108 that connects the fish breeding tank 104 and the sprout container 107 itself to allow gases and/or fluids such as oxygen and water to flow from the fish breeding tank 104 to the sprout container 107.

Method for Growing Arthropods

It is also an object of the present invention to provide a method for growing arthropods using the apparatus according to the description above and/or according to the accompanying claims.

The method includes the steps of arranging a prefixed amount of a substrate and insect larvae within each cell 4 for a prefixed growth period, and subsequently, extracting the substrate contained in one or more cells 4 for collecting insects or insect larvae. In particular, the step of arranging a predetermined amount of a substrate and insect larvae within each cell 4 may include the substeps of:

moving the auxiliary selector 11' from the closed position to the open position, inserting a feeding canula in one or more cells 4 through the auxiliary through opening 12' of the auxiliary selector 11' and the auxiliary through opening 10' of the front plate 8, inserting, via said cannula, nutrients or substrate within a respective cell 4, optionally on the hopper 13.

Following the step of inserting substrate and/or nutrients on the hopper 13, the method may include a step of commanding the movement of the hopper 13 with respect to the cell 4 to pour said nutrients or substrate onto an area of the cell 4 below the hopper 13.

During the predetermined growth period, the procedure may include a step of moving one or more cells 4 with respect to the case 2 for mixing the substrate. Such step may be performed at regular intervals during the predetermined growth period, at decreasing time intervals as the predetermined growth period elapses, or as a result of the detection of an operating condition detected by the control unit 50.

Subsequent to the predetermined growth period, the procedure may additionally include a step of extracting the substrate and the insects or insect larvae by the through opening the front plate 8 of one or more cells 4. In particular, the step of extracting substrate and insects may include the substeps of:
- moving the selector 11 from the closed position to the open position,
- inserting a cannula in one or more cells 4 through the through opening 12 of the selector 11 and the through opening 10 of the front plate 8,
- extracting, through said cannula, substrate and insects or insect larvae.

During the predetermined growth period, the method may further include a step of introducing into the water present inside the collection tank 25, calcium ions (Ca 2+) to allow the immobility of carbon as salt in the form of calcium carbonate ($CaCO_3$) ($Ca(OH)_2 + CO_2 \rightarrow CaCO_3 + H_2O$) and/or as calcium bicarbonate $Ca(HCO_3)_2 \rightarrow CO_2 + H_2O + CaCO_3$. Such step allows to use a limited amount of water and generate usable matter in further industrial production areas (e.g., in agriculture as a soil conditioner or zootechnical feed supplement or as an acidity corrector for fermentation processes).

The invention claimed is:

1. An apparatus for growing arthropods including:
a case having a predetermined number of walls delimiting an inner volume, and
a plurality of cells engaged to the case and housed at least partially in the inner volume, each of the cells comprising a hollow body defining a compartment configured for containing a predetermined amount of a substrate for supporting arthropods,
wherein at least part of each of the cells, in an engagement condition with the case and when said cell is at least partially housed in the inner volume of the case, is movable by rotation about an axis of rotation of the cell with respect to the case for mixing the substrate,
wherein for each of the cells, the hollow body of the cell swings back and forth about the axis of rotation of the cell between a first limit position and a second limit position to mix the substrate in the cell and while the substrate remains in the cell.

2. The apparatus according to claim 1, wherein the hollow body of each cell has an elongated shape having, along a cross section, a substantially circular section.

3. The apparatus according to claim 1, wherein the hollow body of each cell extends along a development direction between a first and a second longitudinal end, wherein each cell is engaged to the case at said first and second longitudinal ends.

4. The apparatus according to claim 3, wherein the axis of rotation of each cell is parallel to the development direction of the cell itself.

5. The apparatus according to claim 3, wherein for each of the cells, the hollow body of the cell has, at the first and second longitudinal ends, respective passage openings in communication with the compartment, wherein the cell comprises a front plate and a back plate respectively engaged at the first and second longitudinal ends of the hollow body occluding of the passage openings.

6. The apparatus according to claim 5, wherein each of the cells includes:
at least one through opening defined on the front plate, configured for allowing at least the passage of the substrate from the hollow body to an environment external the inner volume of the case, wherein said through opening is arranged at a bottom portion of the cell,
at least one selector carried by the front plate and placed close to the through opening, said selector being movable with respect to the hollow body of the respective cell at least between:
a first operating position where the selector is superimposed to the through opening of the front plate for preventing the communication between the external environment and the compartment of the hollow body, and
a second operating position where the selector allows the communication between the external environment and the compartment of the hollow body,
wherein the selector includes a selector through opening, which, is offset and spaced from the through opening of the front plate while the selector is in the first operating position, and
wherein the through opening of the selector, is at least partly facing the through opening of the front plate, while the selector is in the second operating position.

7. The apparatus according to claim 5, wherein each of the cells includes:
at least one auxiliary through opening defined on the front plate, configured for allowing the substrate to pass from an environment external the inner volume of the case to the compartment of the hollow body,
at least one auxiliary selector carried by the front plate close the auxiliary through opening, said auxiliary selector being movable with respect to the hollow body at least between:
a first operating position where the auxiliary selector is superimposed to the auxiliary through opening of the front plate to prevent communication between the external environment and the compartment of the hollow body,
a second operating position where the auxiliary selector allows communication between the external environment and the compartment of the hollow body,
wherein the auxiliary selector includes a respective auxiliary through opening, which, in the first operating position of the auxiliary selector, is offset and spaced from the auxiliary through opening of the front plate,
wherein the auxiliary through opening of the auxiliary selector, in the second operating position of the auxiliary selector, is at least partly facing the auxiliary through opening of the front plate.

8. The apparatus according to claim 7, wherein for each of the cells, the selector and the auxiliary selector are both movable by rotation, one independently of the other, with respect to the front plate about respective axes substantially parallel to the axis of rotation of the hollow body of the respective cell directly carrying said selector and the auxiliary selector.

9. The apparatus according to claim 1, wherein the axis of rotation of each cell is defined in the compartment of the hollow body of the respective cell.

10. The apparatus according to claim 1, wherein the hollow body of each cell has an elongated shape having, along a cross section, a substantially circular, wherein the axis of rotation is coincident with the center of the circular section of the hollow body of the cell itself.

11. The apparatus according to claim 1, wherein the first and second limit positions are angularly offset by an angle in a range of 60° to 140°.

12. The apparatus according to claim 1, wherein for each of the cells, the hollow body of the cell has a plurality of through holes, configured to place the inner volume of the case in communication with the compartment of the hollow body of the cell,
wherein said plurality of holes is uniformly distributed at least along a direction parallel to the axis of rotation of the cell and defined, in use, at a top portion of the hollow body.

13. The apparatus according to claim 1, further comprising a plurality of movement assemblies, each of which is active on a respective cell of the cells and is configured for rotating the hollow body of the respective cell about the axis of rotation of the respective cell,
wherein each movement assembly comprises a rotating element in contact with an outer surface of the hollow body of the respective cell,
wherein at least one of the movement assemblies includes an electric motor active on a rotating element of the respective cell for moving the respective cell,
wherein the apparatus further comprises a control unit active in command on said movement assemblies and configured to cause a movement cycle comprising at least one step of commanding the activation of the movement assemblies for the swinging the hollow bodies of the cells with respect to the case, wherein the control unit is configured for performing the movement cycle at predetermined time intervals or upon receipt of a command signal, wherein the duration of the movement cycle is between 7 seconds and 30 seconds.

14. An apparatus for growing arthropods including:
a case having a predetermined number of walls delimiting an inner volume, and
a plurality of cells engaged to the case and housed at least partially in the inner volume, each of the cells comprising a hollow body defining a compartment configured for containing a predetermined amount of substrate for supporting arthropods,
wherein at least part of each of the cells, in an engagement condition with the case and when said cell is at least partially housed in the inner volume of the case, is movable by rotation about an axis of rotation of the cell with respect to the case for mixing the substrate,
wherein the hollow body of each of the cells extends along a development direction between a first and a second longitudinal end, wherein each of the cells is engaged to the case at said first and second longitudinal ends,
wherein the hollow body of each of the cells has, at the first and second longitudinal ends, respective passage openings in communication with the compartment,
wherein each of the cells comprises a front plate and a back plate respectively engaged at the first and second longitudinal ends of the respective hollow body occluding of the passage openings,
wherein each of the cells has:
at least one through opening defined on the front plate, configured for allowing at least the passage of the substrate from the hollow body to an environment external the inner volume of the case, wherein said through opening is arranged at a bottom portion of the cell,
at least one selector carried by the front plate and proximate to the through opening, said selector being movable with respect to the hollow body of the cell at least between:
a first operating position where the selector is superimposed to the through opening of the front plate for preventing the communication between the external environment and the compartment of the hollow body, and
a second operating position where the selector allows the communication between the external environment and the compartment of the hollow body,
wherein the selector includes a selector through opening offset and spaced from the through opening of the front plate, while the selector is in the first operating position and
wherein the selector through opening is at least partly facing the through opening of the front plate, while the selector is in the second operating position.

15. An apparatus for growing arthropods including:
a case having a predetermined number of walls delimiting an inner volume,
a plurality of cells engaged to the case and housed at least partially in the inner volume, each of the cells comprising a hollow body defining a compartment configured for containing a predetermined amount of substrate for supporting arthropods, wherein at least part of each of the cells, in an engagement condition with the case and when the cell is at least partially housed in the inner volume of the case, is movable by rotation about an axis of rotation of the cell with respect to the case for mixing the substrate,
movement assemblies each of which is active on a respective cell of the cells and configured to rotate the hollow body of the respective cell about an axis of rotation for the respective cell, wherein each of the movement assembly comprises a rotating element in contact with the outer surface of the hollow body of the respective cell for the movement assembly;
an electric motor configured to active the rotating elements to move the hollow bodies of the cells, and
a control unit configured to command said movement assemblies in a movement cycle including commanding each of the movement assemblies to move, relative to the case, the hollow body of the cell corresponding to the movement assembly, wherein the control unit is configured to perform the movement cycle at predetermined time intervals or upon receipt of a command signal, wherein the duration of the movement cycle is in a range of 7 seconds to 30 seconds.

* * * * *